United States Patent
Sone

(10) Patent No.: US 8,575,883 B2
(45) Date of Patent: *Nov. 5, 2013

(54) POWER UNIT FOR ELECTRIC VEHICLE

(75) Inventor: Toshihiro Sone, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 13/354,082

(22) Filed: Jan. 19, 2012

(65) Prior Publication Data

US 2012/0187887 A1    Jul. 26, 2012

(30) Foreign Application Priority Data

Jan. 21, 2011    (JP) ................. P2011-010584

(51) Int. Cl.
  *H02P 27/04*    (2006.01)
  *H02P 23/00*    (2006.01)
  *G05F 1/00*     (2006.01)
  *B60L 3/00*     (2006.01)

(52) U.S. Cl.
  USPC ........... 318/800; 318/504; 323/272; 323/285; 307/9.1

(58) Field of Classification Search
  USPC ............. 318/504, 800; 323/272, 285; 307/9.1
  See application file for complete search history.

(56) References Cited

U.S. PATENT DOCUMENTS

| | | | |
|---|---|---|---|
| 8,297,389 B2 | 10/2012 | Takizawa | |
| 2008/0315803 A1* | 12/2008 | Yonemori et al. | 318/148 |
| 2009/0033257 A1* | 2/2009 | Sato et al. | 318/400.3 |
| 2010/0140002 A1* | 6/2010 | Miura et al. | 180/65.285 |
| 2011/0011658 A1* | 1/2011 | Takizawa | 180/65.31 |
| 2011/0012543 A1* | 1/2011 | Takizawa et al. | 318/139 |
| 2011/0095603 A1 | 4/2011 | Lee et al. | |
| 2012/0187755 A1* | 7/2012 | Sone | 307/9.1 |

FOREIGN PATENT DOCUMENTS

| | | |
|---|---|---|
| JP | 08-214410 A | 8/1996 |
| JP | 2000-324710 A | 11/2000 |
| JP | 2001-136607 A | 5/2001 |
| JP | 2006-180658 | 7/2006 |
| JP | 2007-274830 A | 10/2007 |
| JP | 2007-282485 A | 10/2007 |
| JP | 4353093 B2 | 8/2009 |
| JP | 2010-104165 A | 5/2010 |
| JP | 2010-104169 A | 5/2010 |

OTHER PUBLICATIONS

Office Action; Application No. 2011-010584; dated Jan. 8, 2013.
Office Action; Application No. 2011-010585; dated Jan. 8, 2013.
U.S. Appl. No 13/353,878, Office Action dated Apr. 12, 2013, 8 pages.

* cited by examiner

*Primary Examiner* — Eduardo Colon Santana
*Assistant Examiner* — Gabriel Agared
(74) *Attorney, Agent, or Firm* — Arent Fox LLP

(57) ABSTRACT

A power unit for an electric vehicle includes: a first power source connected between a first node and a second node; a first switch connected between the second node and a third node; a second power source connected between the third node and a fourth node; a second switch connected between the first node and the third node; and a DC-DC converter connected to the second node, wherein the DC-DC converter changes an electric potential of the second node by making the second node connectable to the fourth node or the third node, and an output electric power obtained from between the first node and the fourth node is supplied to an electric motor.

7 Claims, 20 Drawing Sheets

$$\frac{V1}{(V1+Vb1)} = 1 - duty$$

$$duty < 1 \rightarrow V1 = \left(\frac{1}{duty} - 1\right) \cdot Vb1$$

$$\frac{V1}{(V1+Vb1)} = 1-\text{duty}$$

$$\text{duty} = \frac{Vb1}{(Vb1+Vb2)} \rightarrow V1 = Vb2$$

duty=0 duty=0.5
V1=Vb1=Vb2'

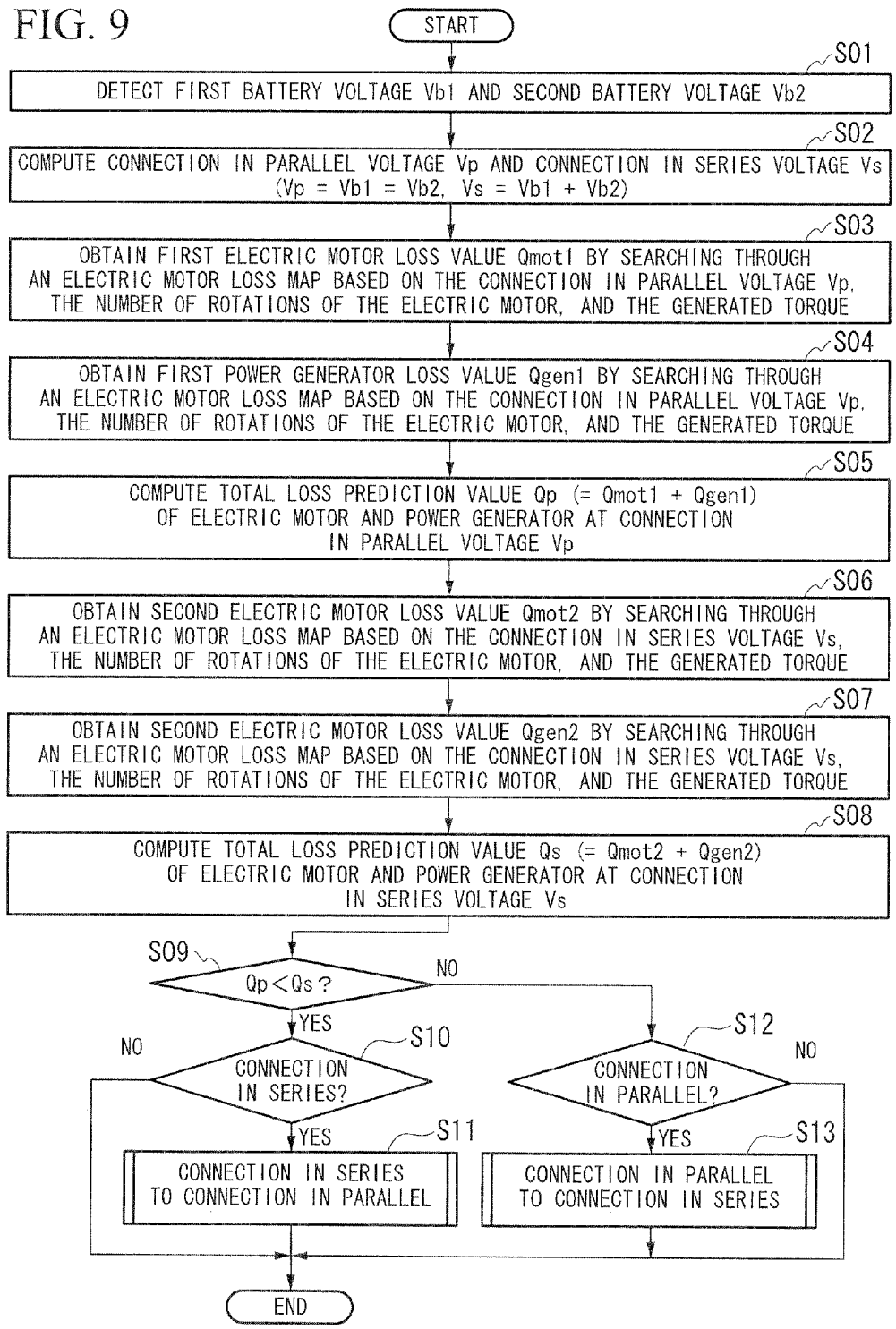

$$\frac{Vb1}{(Vb1+V2)} = 1-duty$$

$$duty<1 \rightarrow V2 = \left(\frac{1}{duty}-1\right) \cdot Vb1$$

$$\frac{Vb1}{(Vb1+V2)} = 1-duty$$

$$duty = \frac{Vb2}{(Vb1+Vb2)} \rightarrow V2=Vb2$$

duty=0 duty=0.5
V2=Vb1=Vb2'

POWER UNIT FOR ELECTRIC VEHICLE

TECHNICAL FIELD

The present invention relates to a power unit for an electric vehicle.

Priority is claimed on Japanese Patent Application No. 2011-010584, filed Jan. 21, 2011, the content of which is incorporated herein by reference.

BACKGROUND ART

Conventionally, a hybrid vehicle is known which includes a first motor generator connected to an internal combustion, a second motor generator connected to a drive wheel, and a voltage-controlled battery connected to an inverter via a switch, for example. The inverter drives and controls each motor generator. Each motor generator performs a voltage adjustment when a connection of a plurality of battery modules included in the voltage-controlled battery is switched between a connection in parallel and a connection in series. In this way, the switch is released. (See, for example, Japanese Patent No. 4353093.)

DISCLOSURE OF INVENTION

Incidentally, according to the hybrid vehicle based on the conventional technology described above, a voltage adjustment is performed by controlling the operation of each motor generator when a connection of a plurality of battery modules included in the voltage-controlled battery is switched between a connection in parallel and a connection in series.

Therefore, during an AER (All Electric Range) travel, when the vehicle is run only with electric power supplied by the battery without using power from an internal combustion, the voltage adjustment cannot be performed. Therefore, there is a problem in that the connection of a plurality of battery modules cannot be switched.

Further, when the connection of a plurality of battery modules is switched, there is a problem in that a travel control is suspended because, since the switch is released, there is a shut-off in the electric power supply from the battery to the inverter driving and controlling each motor generator, and because there is no electric power buffer device other than the battery which can supply electric power to the inverter.

In addition, according to conventional technology, a sudden fluctuation in electric voltage is prevented by dissolving the difference in electric power by controlling the electric voltage by performing a switching operation when the switch is fastened. However, it is not easy to perform such a switching operation. Hence, when the switch is fastened once again after a switching of the connection of the plurality of battery modules is completed, there is a risk that an exceedingly large amount of electric current will run through suddenly.

The present invention is made according to these considerations. An object of the present invention is to provide a power unit for an electric vehicle which can maintain a supply of electric power to a load from a power source while switching a condition in which the power source is connected.

In order to solve the above problem, a power unit for an electric vehicle employs the following configuration:

(1) An aspect of the present invention is a power unit for an electric vehicle including a first power source connected between a first node and a second node; a first switch connected between the second node and a third node; a second power source connected between the third node and a fourth node; a second switch connected between the first node and the third node; and a DC-DC converter connected to the second node. Here, the DC-DC converter changes an electric potential of the second node by making the second node connectable to the fourth node or the third node. An output electric power obtained from between the first node and the fourth node is supplied to an electric motor.

(2) The power unit for the electric vehicle may be configured as follows: the power unit further includes a switching unit switching between a first connected condition, a second connected condition, and a third connected condition. In the first connected condition, the first node is connected with the third node by opening the first switch and closing the second switch. In the second connected condition, the second node is connected with the third node by closing the first switch and opening the second switch. In the third connected condition, the third node is disconnected from the first node and the second node by opening the first switch and opening the second switch. The switching unit switches between the first connected condition and the second connected condition via the third connected condition.

(3) The power unit for the electric vehicle may be configured as follows: the first power source is a first secondary battery; the second power source is a second secondary battery; and in the second connected condition, the DC-DC converter operates intermittently according to a difference in a remaining capacity of the first power source and a remaining capacity of the second power source.

(4) The power unit for the electric vehicle may be configured as follows: the power unit further includes an auxiliary machine between the third node and the fourth node.

(5) The power unit for the electric vehicle may be configured as follows: the switching unit compares a loss of the electric motor in the first connected condition and a loss of the electric motor in the second connected condition, and switches to a condition among the first connected condition and the second connected condition having a smaller loss of the electric motor.

(6) The power unit for the electric vehicle may be configured as follows: the power unit further includes a power generator connected in parallel with the electric motor between the first node and the fourth node. The switching unit compares a sum of a loss of the electric motor and a loss of the power generator in the first connected condition with a sum of a loss of the electric motor and a loss of the power generator in the second connected condition, and switches to a condition among the first connected condition and the second connected condition having a smaller sum of the loss of the electric motor and the loss of the power generator.

(7) The power unit for the electric vehicle may be configured as follows: a low voltage side terminal of the DC-DC converter is connected to the second node, a high voltage side terminal of the DC-DC converter is connected to the first node, and a common terminal is connected to the fourth node.

(8) The power unit for the electric vehicle may be configured as follows: a low voltage side terminal of the DC-DC converter is connected to the second node, a high voltage side terminal of the DC-DC converter is connected to the fourth node, and a common terminal is connected to the first node.

According to a power unit for an electric vehicle based on (1) above, when a load of an electric motor is small, and when a drive voltage necessary for the electric motor is small, a first power source and a second power source are connected in parallel with respect to the electric motor by opening the first switch and closing the second switch.

Meanwhile, when the load of the electric motor is large, and when the drive voltage necessary for the electric motor is large, the first power source and the second power source are connected in series with respect to the electric motor by closing the first switch and opening the second switch.

In these ways, when the load of the electric motor is large, a desired engine performance may be obtained by increasing the drive voltage of the electric motor. When the load of the electric motor is small, the drive voltage of the electric motor is prevented from becoming exceedingly large. Therefore, it is possible to enhance the driving efficiency of the inverter which drives and controls the electric motor. It is also possible to enhance the driving efficiency of the electric motor.

Furthermore, when a connection in parallel of the first power source and the second power source with respect to the electric motor is switched to a connection in series according to an increase in the load of the electric motor, the second power source is cut off from the electric motor by opening the first switch and the second switch. In this way, electric power is supplied to the electric motor only with the first power source.

In addition, a boost operation of a DC-DC converter is performed until the electric potential of the second node connected to the first switch becomes equal to the electric potential of the third node connected to the first switch. Then, the boost operation of the DC-DC converter is halted, and the first switch is closed.

As a result, according to the magnitude of the load of the electric motor in a condition in which the power supply with respect to the electric motor is maintained, it is possible to switch the connection between the first power source and the second power source with respect to the electric motor between a connection in parallel and a connection in series. For example, even during an AER (All Electric Range) travel, when the vehicle is run only with electric power supplied by the battery without using power from an internal combustion, the cruise control may be maintained at least by the electric power supplied by the first power source.

Furthermore, by operating the DC-DC converter when the connection between the first power source and the second power source are switched, it is possible to restrict an increase in switching loss.

In addition, even when the power unit for the electric vehicle also includes an auxiliary power unit (APU) including a power generator and the like, at least the first power source acts as a battery. Therefore, the input-output difference between the auxiliary power unit and the electric motor may be absorbed by the first power source. Thus, a cruise control may be performed while reducing the fluctuation in electrical voltage.

Further, when the first power source and the second power source are connected in series as a battery, for example, it is possible to adjust the difference between the remaining capacity (SOC) of the first power source and the second power source by operating the DC-DC converter.

Moreover, since it is not necessary to connect the auxiliary power unit to the electric motor side to which a direct circuit voltage is applied, a low-voltage device may be used as the auxiliary power unit. Hence, it is possible to prevent the costs for configuring the device from increasing.

In addition, when the difference between the remaining capacity (SOC) of the first power source and the second power source is adjusted, it is possible to reduce the switching loss by, for example, allowing the DC-DC converter to be operated when the difference between the remaining capacity (SOC) is greater than or equal to a predetermined difference, for example, thereby operating the DC-DC converter intermittently. In this way, the switching loss may be reduced compared to an instance in which the DC-DC converter is operated constantly.

According to a power unit for an electric vehicle based on (2) above, when a connection between a first power source and a second power source with respect to an electric motor is switched over between a connection in parallel and a connection in series according to an increase in a load of the electric motor, a first switch and a second switch are opened, and the second power source is cut off from the electric motor. In addition, the third node, the first node, and the second node are cut off. A third connection condition is passed through. The third connection condition supplies electric power to the electric motor by only the first power source.

As a result, it is possible to switch the connection between the first power source and the second power source with respect to the electric motor between a connection in parallel and a connection in series according to the magnitude of the load of the electric motor in a condition in which the electric power supply with respect to the electric motor is maintained. For example, even during an AER (All Electric Range) travel, when the vehicle is run only electric power supplied by the battery without using power from an internal combustion, the cruise control may be maintained at least by the electric power supplied by the first power source.

According to a power unit for an electric vehicle based on (3) above, the first power source and the second power source are secondary batteries. In the second connection condition, the DC-DC converter operates intermittently according to a difference between the remaining capacity of the first power source and the remaining capacity of the second power source.

According to a power unit for an electric vehicle based on (4) above, a consumed power of an auxiliary machine may be supplied from the second power source. As a result, when a connection between the first power source and the second power source with respect to the electric motor is switched between the connection in parallel and the connection in series, a greater amount of electric power may be supplied to the electric motor from the first power source providing the consumed power of the electric motor.

According to a power unit for an electric vehicle based on (5) above, the connection between the first power source and the second power source is switched between a connection in series and a connection in parallel by comparing the loss of the electric motor in the first connection condition and the loss of the electric motor in the second connection condition. In this way, the electric vehicle mounted with the power unit may be operated efficiently.

According to a power unit for an electric vehicle based on (6) above, the connection between the first power source and the second power source is switched between a connection in series and a connection in parallel by comparing the total loss of the electric motor and the power generator in the first connection condition and the total loss of the electric motor and the power generator in the second connection condition. As a result, the electric vehicle mounted with the power unit may be operated efficiently.

According to a power unit for an electric vehicle based on (7) above, for instance, a switching element of a high side arm of a chopper type DC-DC converter is connected to a first node, a switching element of a low side arm is connected to a fourth node, and a choke coil is connected to a second node.

BRIEF DESCRIPTION OF THE DRAWINGS

FIG. 9 is a flowchart showing an operation of a power unit of an electric vehicle according to the above embodiment.

EMBODIMENT FOR CARRYING OUT THE INVENTION

Hereunder, a power unit for an electric vehicle according to an embodiment of the present invention is described with reference to the attached diagrams.

Figure 1:
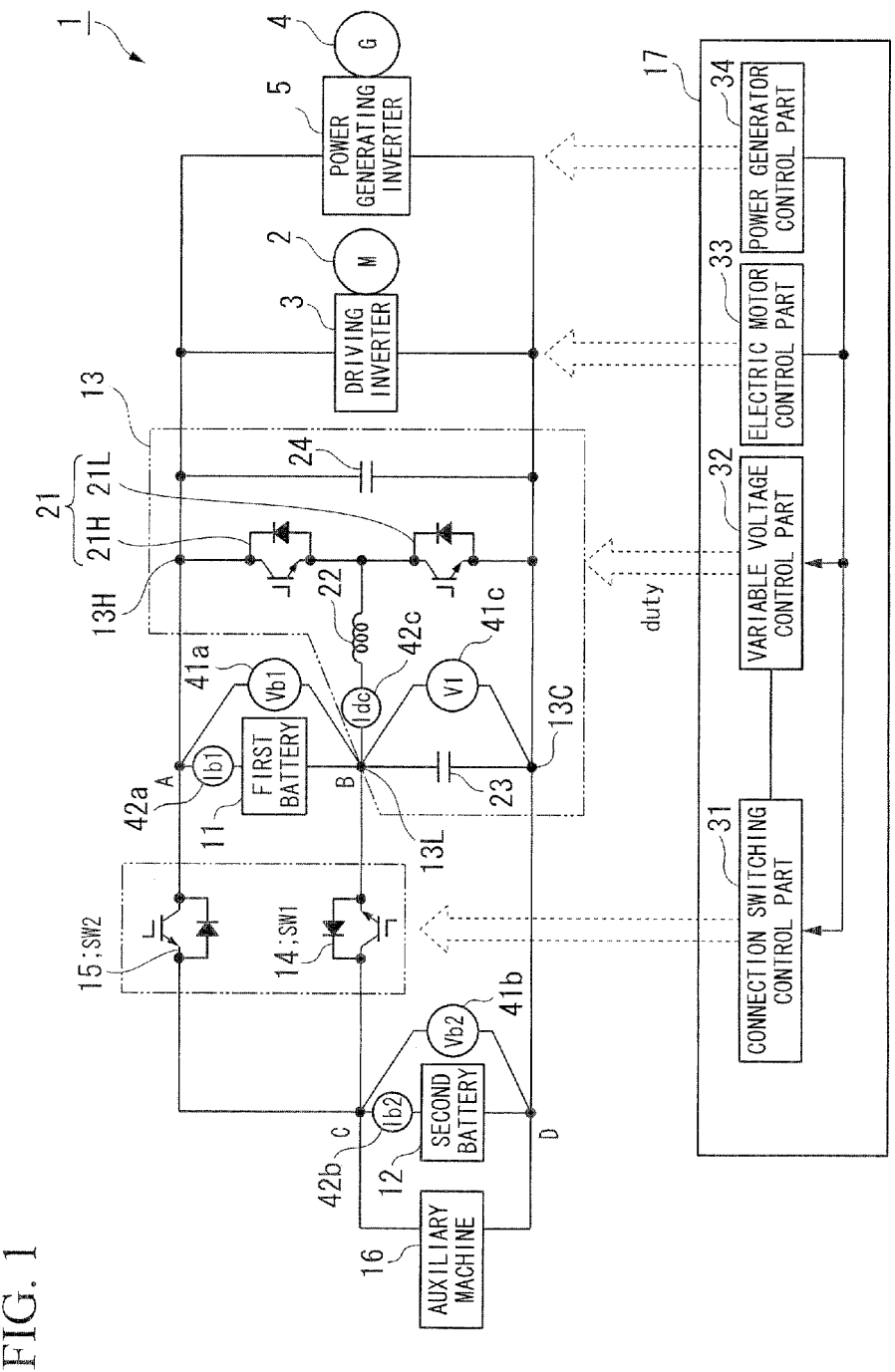
FIG. 1 is a configuration diagram of a power unit of an electric vehicle according to an embodiment of the present invention.

As shown in FIG. 1, for example, the power unit 1 for the electric vehicle according to the above embodiment comprises a power source supplying electric power to a driving inverter 3 for driving and controlling a electric motor (M) 2 generating a cruise driving force of the electric vehicle.

Incidentally, the driving inverter 3 is configured so that a power generating inverter 5 (an inverter for generating power), which controls a power generation of a power generator (G) 4, is connected in parallel with respect to the power unit 1 for the electric vehicle. It is possible to supply electric power from the power generating inverter 5 to the driving inverter 3.

The power unit 1 for the electric vehicle comprises a first node A, a second node B, a third node C, a fourth node D, a first battery 11, a second battery 12, DC-DC converter 13, a first switch (SW1) 14, a second switch (SW2) 15, an auxiliary machine 16, and a control device 17.

Further, a driving inverter 3 and a power generating inverter 5 are connected in parallel with respect to the first node A and the fourth node D.

The first battery 11 is connected between the first node A and the second node B.

The second battery 12 is connected between the third node C and the fourth node D.

The DC-DC converter 13 is connected to the second node B. More specifically, the low voltage side terminal 13L is connected to the second node B. A high voltage side terminal 13H is connected to the first node 1A. A common terminal 13C is connected to a fourth node D.

The DC-DC converter 13 is, for example, a chopper type DC-DC converter. The DC-DC converter 13 comprises a switching circuit 21, a choke coil 22, and a first and second smoothing condenser 23, 24. The switching circuit 21 comprises a plurality of switching elements (for example, an IGBT: Insulated Gate Bipolar Mode Transistor) being connected.

The switching circuit 21 comprises, for example, a pair of high side switching element 21H and a low side switching element 21L being connected.

Further, a collector of the high side switching element 21H is connected to the high voltage side terminal 13H. An emitter of the low side switching element 21L is connected to the common terminal 13C. An emitter of the high side switching element 21H is connected to a collector of the low side switching element 21L.

In addition, a diode is connected between the emitter-collector of each high side switching element 21H and low side switching element 21L so that a forward direction is created from the emitter to the collector.

The switching circuit 21 is driven by a signal (PWM signal) that has undergone a pulse width modulation (PWM). The signal is outputted from the control device 17 and is inputted to a gate of each switching element 21H, 21L. In this way, a switching is made so as to alternate between a condition in which the high side switching element 21H is turned on and the low side switching element 21L is turned off, and a condition in which the high side switching element 21H is turned off and the low side switching element 21L is turned on.

For example, the on/off condition of the high side switching element 21H and the low side switching element 21L are switched according to a switching duty. An example of a switching duty (referred to as "duty") is defined by the duration of time (THon) for which the high side switching element 21H is turned on in one period of the PWM signal and by the duration of time (TLon) for which the low side switching element 21L is turned on in one period of the PWM signal. Thus, in this example, the equation duty=THon/(THon+TLon) and the like holds.

Incidentally, an appropriate "dead time" is set when the on/off condition is switched. During the "dead time," the high side switching element 21H and the low side switching element 21L are prohibited from being turned on at the same time. Instead, both the high side switching element 21H and the low side switching element 21L are turned off.

The choke coil 22 is configured so that one end is connected between an emitter-collector of the high side switching element 21H and the low side switching element 21L of the switching circuit 21, while another end is connected to the low voltage side terminal 13L.

The first smoothing condenser 23 is connected between the low voltage side terminal 13L and the common terminal 13C. The second smoothing condenser 24 is connected between the high voltage side terminal 13H and the common terminal 13C.

When the DC-DC converter 13 undergoes a pressure rising operation from a low voltage side to a high voltage side, first, the high side switching element 21H is turned off, and the low side switching element 21L is turned on. A direct current energization of the choke coil 22 is performed by an electric current inputted from the low voltage side terminal 13L. As a result, magnetic energy is stored.

Next, an induced voltage is generated is generated between both ends of the choke coil 22 so as to prevent a change in magnetic flux due to an interruption in electric current running through the choke coil 22 since the high side switching element 21H is turned on and the low side switching element 21L is turned off.

Accordingly, the induced voltage due to the magnetic energy accumulated in the choke coil 22 is loaded on the input voltage at the low voltage side. In this way, a boosted voltage, higher than the input voltage at the lower voltage side, is applied to the high voltage side.

The fluctuation in voltage occurring due to this switching operation is smoothed by the first and second smoothing condensers 23, 24. The boosted voltage is outputted from the high voltage side terminal 13H.

Incidentally, during a depressor operation from a high voltage side to a low voltage side, first, the high side switching element 21H is turned off, and the low side switching element 21L is turned on. A direct current energization of the choke coil 22 is performed by an electric current inputted from the high voltage side. As a result, magnetic energy is stored.

Next, an induced voltage is generated is generated between both ends of the choke coil 22 so as to prevent a change in magnetic flux due to an interruption in electric current running through the choke coil 22 since the high side switching element 21H is turned on and the low side switching element 21L is turned off.

The induced voltage due to the magnetic energy accumulated in the choke coil 22 becomes a depressor voltage since the input voltage at the high voltage side is lowered according to the switching duty. In this way, the depressor voltage is applied to the low voltage side.

The first switch (SW1) 14 is connected between the second node B and the third node C.

The second switch (SW2) 15 is connected between the first node A and the third node C.

The first switch 14 and the second switch 15 are, for example, a switching element (IGBT: Insulated Gate Bipolar Mode Transistor). An on-off control is performed according to the signal outputted from the control device 17.

Incidentally, for example, the first switch (SW1) 14, which is a switching element, is configured so that an emitter is connected to the second node B, a collector is connected to the third node C. Further, a diode is connected between the emitter and the collector so that a direction from the emitter to the collector becomes the forward direction.

Further, for example, the second switch (SW2) 15, which is a switching element, is configured so that a collector is connected to the first node A, an emitter is connected to the third node C. In addition, a diode is connected between the emitter and the collector so that a direction from the emitter to the collector becomes the forward direction.

The auxiliary machine 16 is connected between the third node C and the fourth node D. Electric power is supplied from the second battery 12.

The control device 17 includes, for example, a connection switching control part 31, a variable voltage control part 32, an electric motor control part 33, and a power generator control part 34.

Signals are imputed to the control device 17. Examples of the signals include the following: a signal outputted by the voltage sensor 41a detecting a voltage (first battery voltage) Vb1 of the first battery 11 and by the electric current sensor 42a detecting an electric current (first battery current) Ib1; a signal outputted by the voltage sensor 41b detecting a voltage (second battery voltage) Vb2 of the second battery 12 and by the electric current sensor 42b detecting an electric current (second battery current) Ib2; a signal outputted by the voltage sensor 41c detecting an electric voltage V1 (first DC-DC converter voltage) of the first smoothing condenser 23 of the DC-DC converter 13, i.e., an electric voltage V1 between the low voltage side terminal 13L and the common terminal 13C and by the electric current sensor 42c detecting an input current Idc of the DC-DC converter 13 (DC-DC converter input current); a signal outputted by each sensor (not diagrammed) detecting the number of rotations of the electric motor (M) 2 and the generated torque; and a signal outputted from each sensor (not diagrammed) detecting the number of rotations of the electric motor (M) 4 and the generated torque.

The connection switching control part 31 controls the on-off operations of the first switch (SW1) 14 and the second switch (SW2) 15.

The variable voltage control part 32 controls the switching operation of the DC-DC converter 13 according to the switching duty (duty) of the signal (PWM signal) that has undergone a pulse width modification (PWM). In other words, the variable voltage control part 32 controls the on-off operations of each switching element 21H and 21L.

Incidentally, a switching duty (duty) refers to, for example, a ratio of an on-period of each switching element 21H, 21L during one period of a PWM signal.

Further, due to the switching operation of the DC-DC converter 13, the variable voltage control part 32 changes the electric potential of the second node B by, for example, making the second node B connectable to the fourth node D. Alternatively, the variable voltage control part 32 changes the electric potential of the second node B by, for example, making the second node B connectable to the third node C.

When an electric motor (M) 2 such as a three-phase brushless DC motor is driven, for example, the electric motor control part 33 performs a feedback control (vector control) of the electric current on a dq coordinate forming a rotational orthogonal coordinate. In this way, the electric motor control part 33 controls the electric power conversion operation of the driving inverter 3 converting a direct current (DC) electric power supplied by each battery 11, 12 to an alternating-current (AC) electric power.

For example, the electric motor control part 33 computes a target d-axis electric current and a target q-axis electric current according to a torque command against the electric motor (M) 2. The electric motor control part 33 then computes each phase output voltage Vu, Vv, Vw of three phases based on the target d-axis electric current and the target q-axis electric current. According to each phase output voltage Vu, Vv, Vw, the electric motor control part 33 input a PWM signal to the driving inverter 3. This PWM signal is a gate signal.

Further, the electric motor control part 33 performs a feedback control so that each deviation between the following electric currents becomes zero: the d-axis electric current and the q-axis electric current obtained by converting to a dq coordinate, the detected values of each phase electric current Iu, Iv, Iw actually supplied to the electric motor (M) 2 from the driving inverter 3; and the target d-axis electric current and the target q-axis electric current.

The power generator control part 34 performs an on-off driving operation of each switching element of the power generating inverter 5 according to the gate signal synchronized based on the shape of the outputted wave of the rotational angle of the rotator of the electric motor (G) 4, for example. In this way, the power generator control part 34 converts an AC electric power outputted by the power generator (G) 4 to a DC electric power.

For example, the power generator control part 34 performs a feedback control of the generated electric voltage based on the duty of the gate signal relating to the on-off driving operation of each switching element of the power generating inverter 5. In this way, the power generator control part 34 outputs a predetermined DC voltage to a primary side of the power generating inverter 5.

The power unit 1 for the electric vehicle according to the above embodiment is, for example, configured as described above. Next, an operation of the power unit 1 for the electric vehicle is described.

Figure 2A:
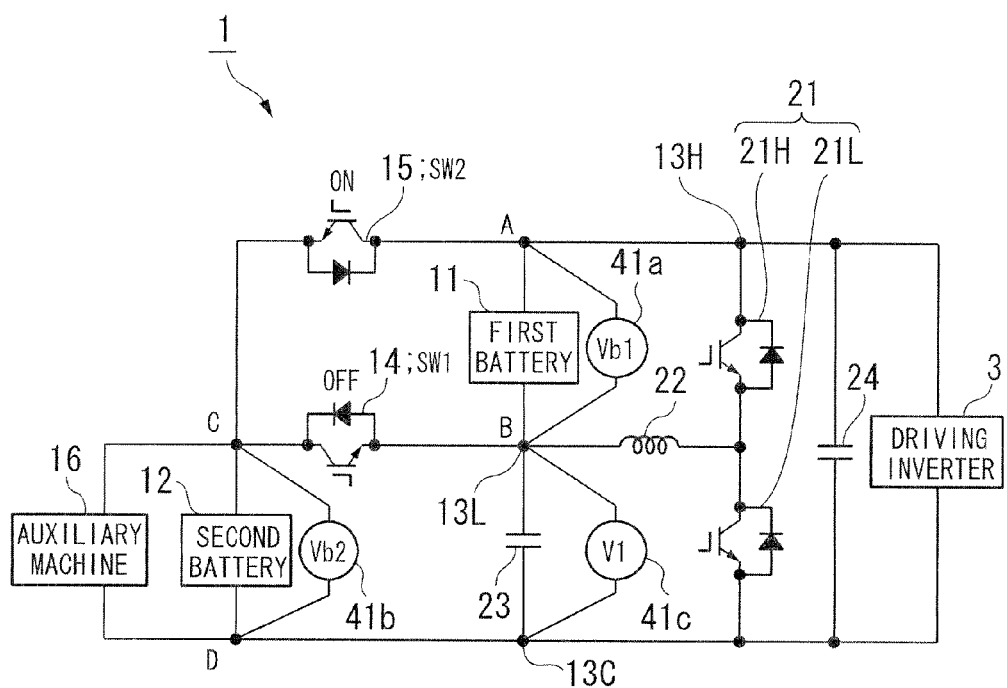
FIG. 2A is a diagram showing a condition in which a first battery and a second battery are connected in parallel with respect to an inverter for driving an electric motor (M) of a power unit of an electric vehicle according to the above embodiment.

As shown in FIG. 2A, when the load of the electric motor (M) 2 is small and the driving voltage necessary for the electric motor (M) 2 is small, the control device 17 opens the first switch (SW1) 14 (i.e., turns off the first switch) and closes the second switch (SW2) 15 (i.e., turns on the second switch). In this way, the first battery 11 and the second battery 12 are connected in parallel with respect to the driving inverter 3 of the power generator (M) 2.

Figure 3:
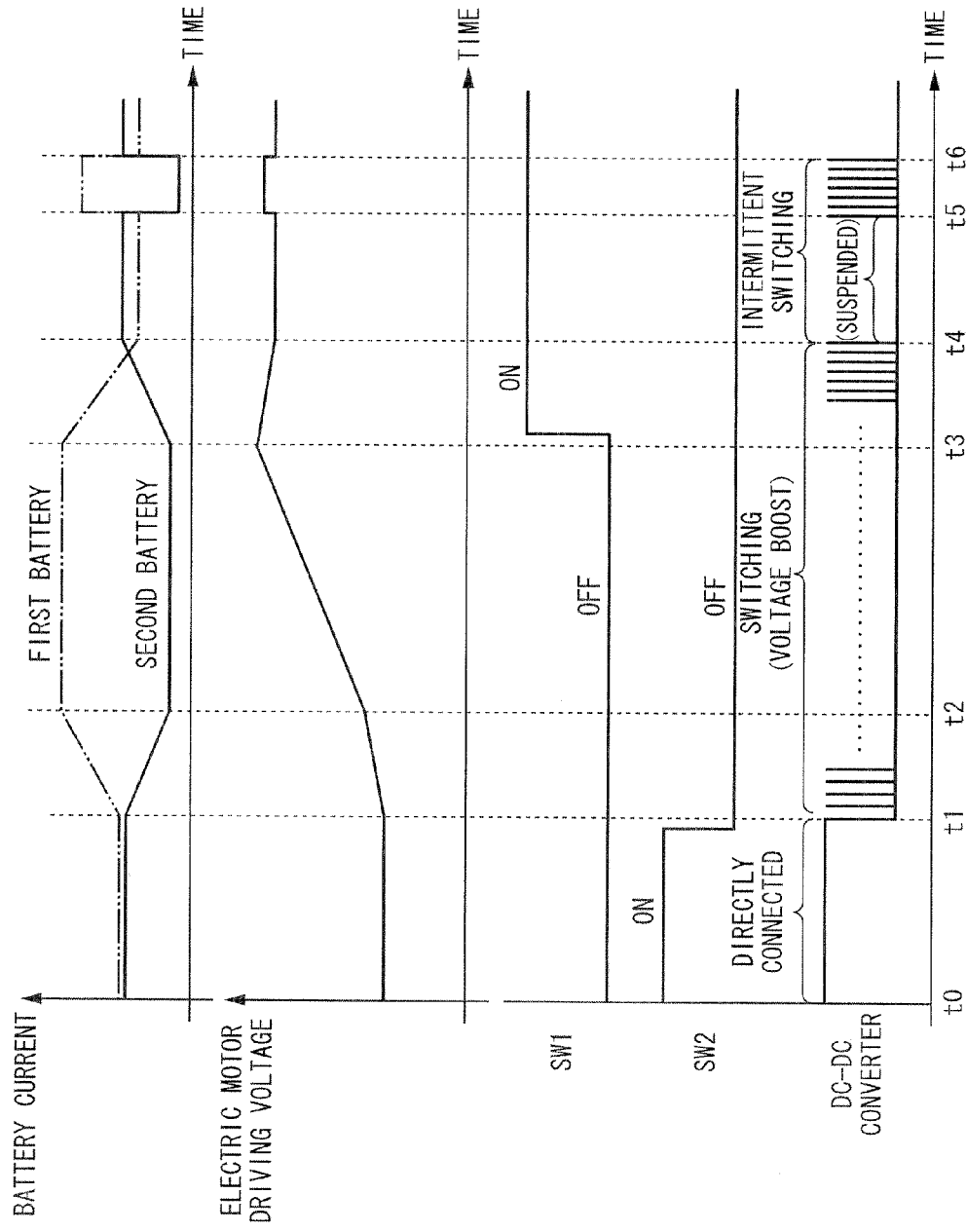
FIG. 3 is a diagram showing an example of a change in a battery current and an electric motor driving voltage corresponding to an operation a DC-DC converter and a connection condition between a first battery and a second battery with respect to an inverter for driving an electric motor (M) of a power unit of an electric vehicle according to the above embodiment.

When this connection in parallel is made, a direct connection may be made to the DC-DC converter 13, for example, during a time interval from time t0 to time t1 as shown in FIG. 3. When the DC-DC converter 13 is directly connected, the switching duty (duty) is set to be equal to 1. Further, the low side switching element 21L is fixed to be turned on.

Figure 2B:
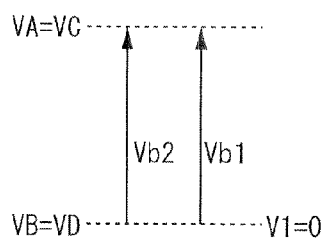
FIG. 2B is a diagram showing a condition in which a first battery and a second battery are connected in parallel with respect to an inverter for driving an electric motor (M) of a power unit of an electric vehicle according to the above embodiment.

Accordingly, as shown in FIG. 2B, for example, the electric potential VA of the first node A becomes equal to the electric potential VC of the third node C. At the same time, the electric potential VB of the second node B becomes equal to the electric potential VD of the fourth node D. In this way, the first battery voltage Vb1 is equal to the second battery voltage Vb2. At the same time, the first battery electric current Ib1 is equal to the second battery electric current Ib2. Further, the first DC-DC converter voltage V1 equals zero.

Moreover, the electric potential VA of the first node A and the electric potential VC of the third node C becomes higher than the electric potential VB of the second node B and the electric potential VD of the fourth node D by an amount of the first battery voltage Vb1 or the second battery voltage Vb2.

During this connection in parallel, when the driving voltage necessary for the electric motor (M) 2 becomes large due to, for example, an increase in the load of the electric motor (M) 2, the control device 17 makes a switching operation so that the first battery 11 and the second battery 12 are connected in series with respect to the driving inverter 3 of the electric motor (M) 2.

When this connection-switching operation is performed, the control device 17 first maintains the first switch (SW1) 14 in an opened state (i.e., the first switch is turned off), and switches the second switch (SW2) 15 from a closed state (i.e., the second switch is turned on) to an opened state (i.e., the second switch is turned off).

Further, the control device 17 reduces the value of the switching duty of the DC-DC converter to a value less than 1. The value of the switching duty of the DC-DC converter is represented by the following equation (1), for example. In this way, a switching operation is performed.

(Equation 1)

$$\frac{V1}{(V1 + Vb1)} = 1 - \text{duty} \quad (1)$$

Figure 4A:
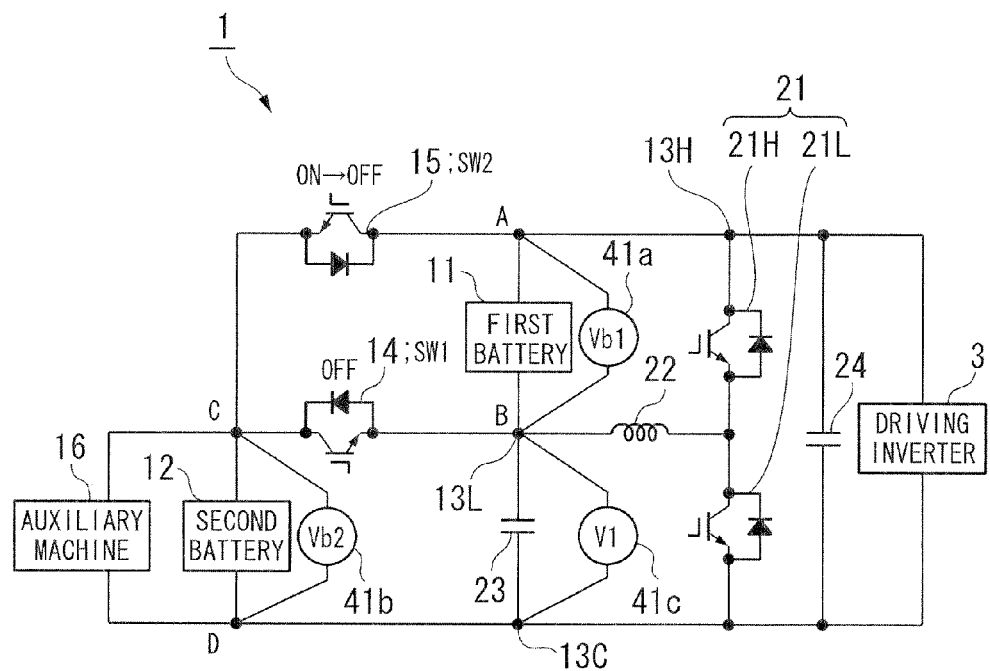
FIG. 4A is a diagram showing a condition of switching a connection between a first battery and a second battery from a connection in parallel to a connection in series with respect to an inverter for driving an electric motor (M) of a power unit of an electric vehicle according to the above embodiment.
Figure 4B:
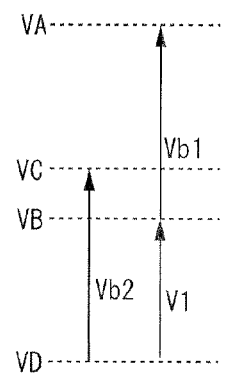
FIG. 4B is a diagram showing a condition of switching a connection between a first battery and a second battery from a connection in parallel to a connection in series with respect to an inverter for driving an electric motor (M) of a power unit of an electric vehicle according to the above embodiment.

Accordingly, as shown in FIG. 4B and the following equation (2), for example, the first DC-DC converter voltage V1 increases to a value greater than zero. The electric potential VB of the second node B becomes greater than the electric potential VD of the fourth node D by an amount of the first DC-DC converter voltage V1. The electric potential VA of the first node A becomes higher than the electric potential VD of the fourth node D by a sum of the first DC-DC converter voltage V1 and the first battery voltage Vb1 (V1+Vb1).

(Equation 2)

$$V1 = \left(\frac{1}{\text{duty}} - 1\right) \cdot Vb1 \quad (2)$$

Further, when this connection-switching operation is performed, for example during the timer interval from time t1 to time t3 shown in FIG. 3, the electric motor driving voltage supplied to the driving inverter 3 of the electric motor (M) 2 increases in accordance with the increase in the first DC-DC converter voltage V1.

Further, the first battery electric current Ib1 increases to a predetermined high side electric current value. Then, the first battery electric current Ib1 is kept constant at this high side electric current value.

In addition, the second battery electric current Ib2 decreases to a predetermined low side electric current value. Then, the second battery electric current Ib2 is kept constant at this low side electric current value.

Figure 5A:
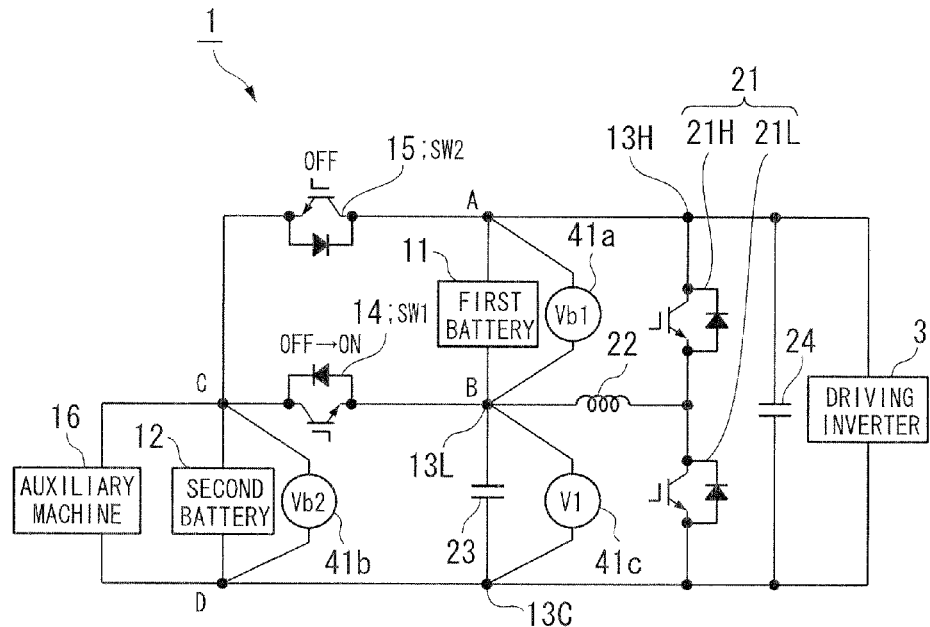
FIG. 5A is a diagram showing a condition of switching a connection between a first battery and a second battery from a connection in parallel to a connection in series with respect to an inverter for driving an electric motor (M) of a power unit of an electric vehicle according to the above embodiment.

Next, when the first DC-DC converter voltage V1 reaches the second battery voltage Vb2, i.e., when the second node B may be connected to the third node C, the control device 17 maintains the switching operation of the DC-DC converter 13 as shown in FIG. 5A, for example. In addition, the control device 17 switches the first switch (SW1) 14 from an opened state (i.e., a state in which the first switch is turned off) to a closed state (i.e., a state in which the first switch is turned on). At the same time, the second switch (SW2) 15 is maintained to be an opened state (i.e., turned off). Further, the first battery 11 and the second battery 12 are connected in series with respect to the driving inverter 3 of the electric motor (M) 2.

Figure 5B:
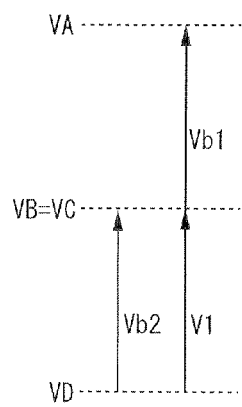
FIG. 5B is a diagram showing a condition of switching a connection between a first battery and a second battery from a connection in parallel to a connection in series with respect to an inverter for driving an electric motor (M) of a power unit of an electric vehicle according to the above embodiment.

As a result, as shown in FIG. 5B for example, the electric potential VB of the second node B becomes equal to the electric potential VC of the third node C. At the same time, the electric potential VB of the second node B and the electric potential VC of the third node C becomes greater than the electric potential VD of the fourth node D by an amount of the first DC-DC converter voltage V1. The first DC-DC converter V1 is the same as the second battery voltage Vb2. The electric potential VA of the first node A becomes higher than the electric potential VC of the third node C by an amount of the first battery voltage Vb1.

When this connection in series is made, the switching duty of the DC-DC converter 13 is represented as shown in the following equation (3), for example.

(Equation 3)

$$\text{duty} = \frac{Vb1}{(Vb1 + Vb2)} \quad (3)$$

When the above connection in series is made, the first battery electric current Ib1 decreases from a predetermined high side electric current value, and the second battery electric current Ib2 increases from a predetermined low side electric current value. These changes are shown, for example in FIG. 3 corresponding to the time period from time t3 to time t4.

When the above connection in series is made, the control device 17 basically stops the switching operation of the DC-DC converter 13, as shown in FIG. 3, for example, corresponding to the time period from time t4 to time t6. The control device 17 performs an intermittent switching operation by performing a switching operation temporarily according to the condition of the second battery 12 supplying electric power to the auxiliary machine 16, for example.

Figure 6A:
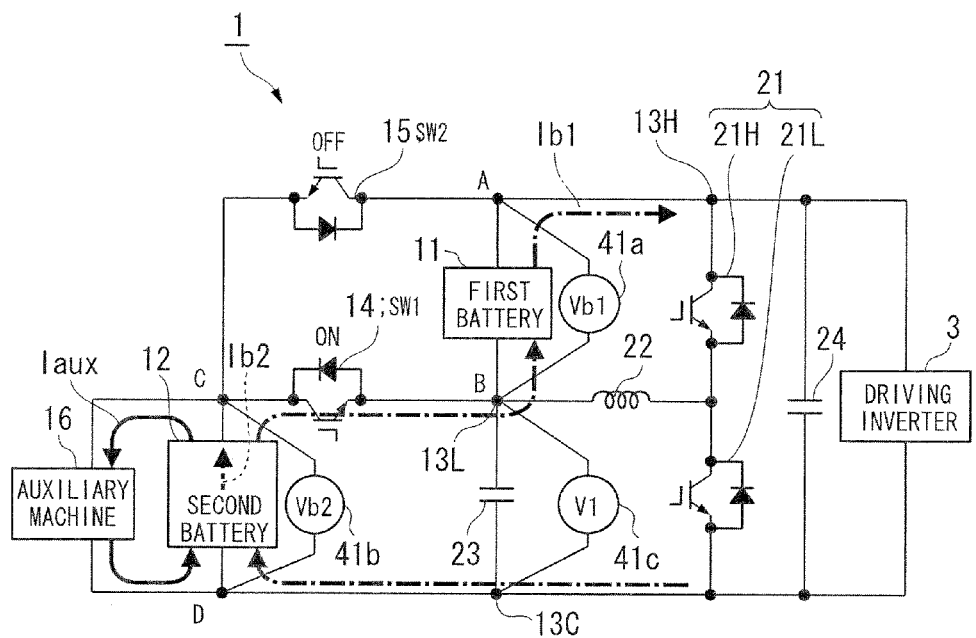
FIG. 6A is a diagram showing a condition of halting a DC-DC converter when a first battery and a second battery are connected in series with respect to an inverter for driving an electric motor (M) of a power unit of an electric vehicle according to the above embodiment.
Figure 6B:
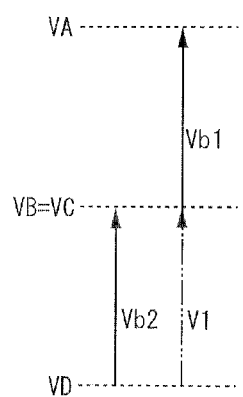
FIG. 6B is a diagram showing a condition of halting a DC-DC converter when a first battery and a second battery are connected in series with respect to an inverter for driving an electric motor (M) of a power unit of an electric vehicle according to the above embodiment.

As shown in FIGS. 6A and 6B, for instance, when the switching operation of the DC-DC converter 13 is halted during a connection in series, the switching duty (duty) equals zero. Further, as shown in FIG. 7, for example, the first battery electric current Ib1 at the operating point of the first battery 11 becomes smaller than the second battery electric current Ib2 at the operating point of the second battery 12 by an amount of the electric current Iaux supplied from the second battery 12 to the auxiliary machine 16.

Figure 8A:
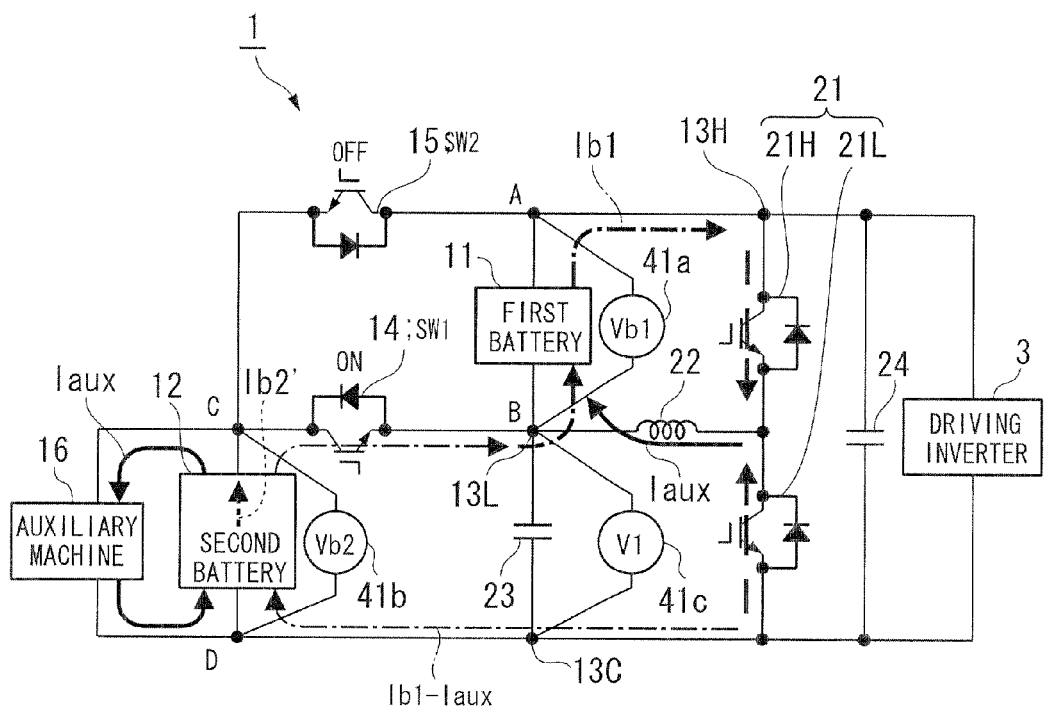
FIG. 8A is a diagram showing a condition in which a switching operation of a DC-DC converter is executed when a first battery and a second battery are connected in series with respect to an inverter for driving an electric motor (M) of a power unit of an electric vehicle according to the above embodiment.
Figure 8B:
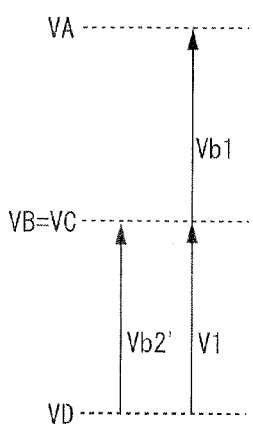
FIG. 8B is a diagram showing a condition in which a switching operation of a DC-DC converter is executed when a first battery and a second battery are connected in series with respect to an inverter for driving an electric motor (M) of a power unit of an electric vehicle according to the above embodiment.

Further, as shown in FIGS. 8A and 8B, for instance, when a switching operation of the DC-DC converter is performed during a connection in series, the operating point of the second battery 12 deviates compared to the condition in which the DC-DC converter 13 is halted.

For example, when the switching duty is set to 0.5, the electric current Iaux runs through the low voltage side terminal 13L of the DC-DC converter 13. The electric current Iaux is the same as the electric current Iaux supplied from the second battery 12 to the auxiliary machine 16.

Figure 7:
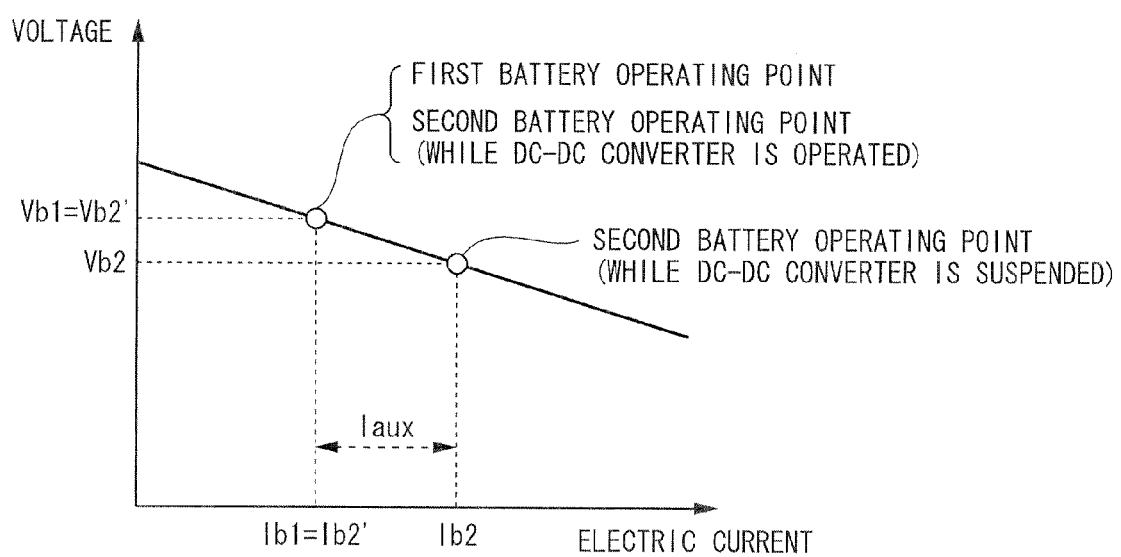
FIG. 7 is a diagram showing an example of an operating point of a first battery and a second battery in a condition in which a switching operation is executed and in a condition in which a DC-DC converter is halted when a first battery and a second battery are connected in series with respect to an inverter for driving an electric motor (M) of a power unit of an electric vehicle according to the above embodiment.

Further, as shown in FIG. 7, for example, the operating point of the second battery 12 becomes equal to the operating point of the first battery 11. Thus, the first battery voltage Vb1 becomes equal to the second battery voltage Vb2'. At the same time, the first battery electric current Ib1 becomes equal to the second battery electric current Ib2'.

Hereinafter, a switching operation of switching the connection between the first battery 11 and the second battery 12 with respect to the driving inverter 3 of the electric motor (M) 2 to a connection in parallel or to a connection in series is described.

First, in step S01 shown in FIG. 9, for example, the first battery voltage Vb1 and the second battery voltage Vb2 are detected.

Next, in step S02, a connection in parallel voltage Vp (=Vb1=Vb2) is computed. The connection in parallel voltage Vp corresponds to a condition in which the switching duty of the DC-DC converter 13 during a connection in parallel equals one. A connection in series voltage Vs (=Vb1+Vb2) is also computed. The connection in series voltage Vs corresponds to a condition in which the switching duty of the DC-DC converter 13 during a connection in parallel equals zero.

Figure 10:
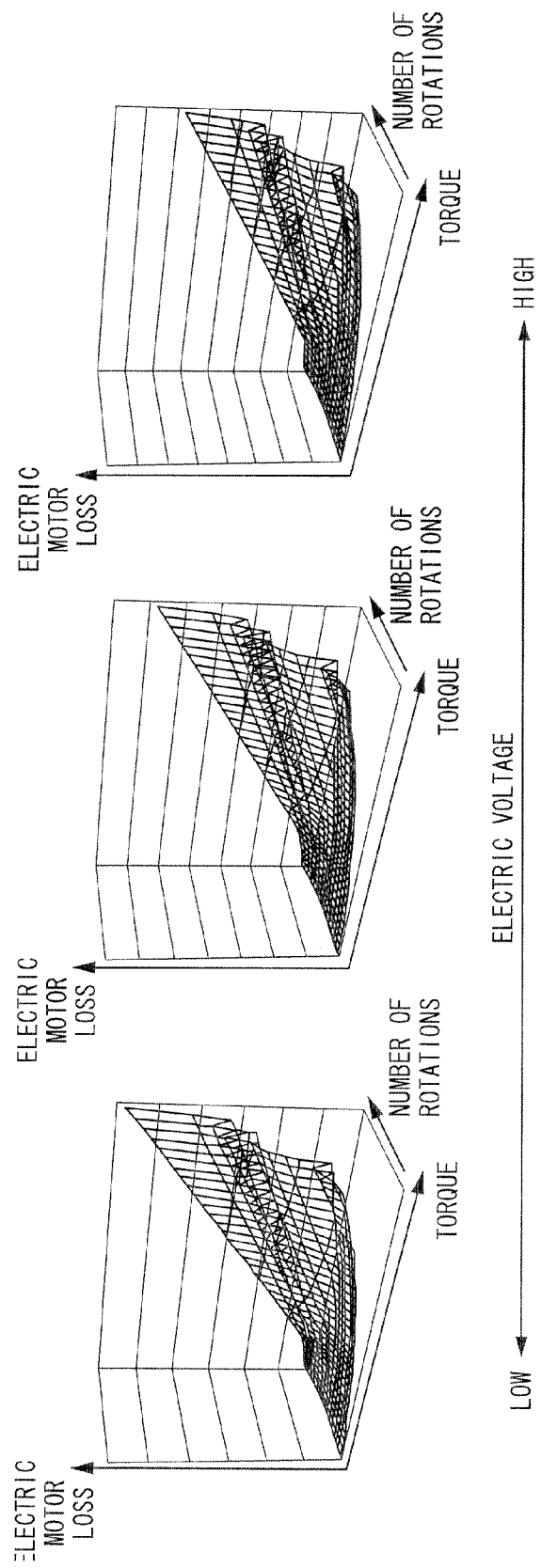
FIG. 10 is a diagram showing an example of an electric motor loss map according to the above embodiment.

Next, in step S03, a first electric motor loss value Qmot1 is obtained by searching through an electric motor loss map as shown in FIG. 10, for example, in accordance with the connection in parallel voltage Vp, the number of rotations of the electric motor (M) 2, and the generated torque.

Incidentally, the electric motor loss map is created according to the examination result of a test that is conducted in advance. For example, as a result of an increase in the number of rotations of the electric motor (M) 2 or an increase in the generated torque, the electric motor loss value increases. As a result of an increase in electric voltage, the electric motor loss value decreases.

Figure 11:
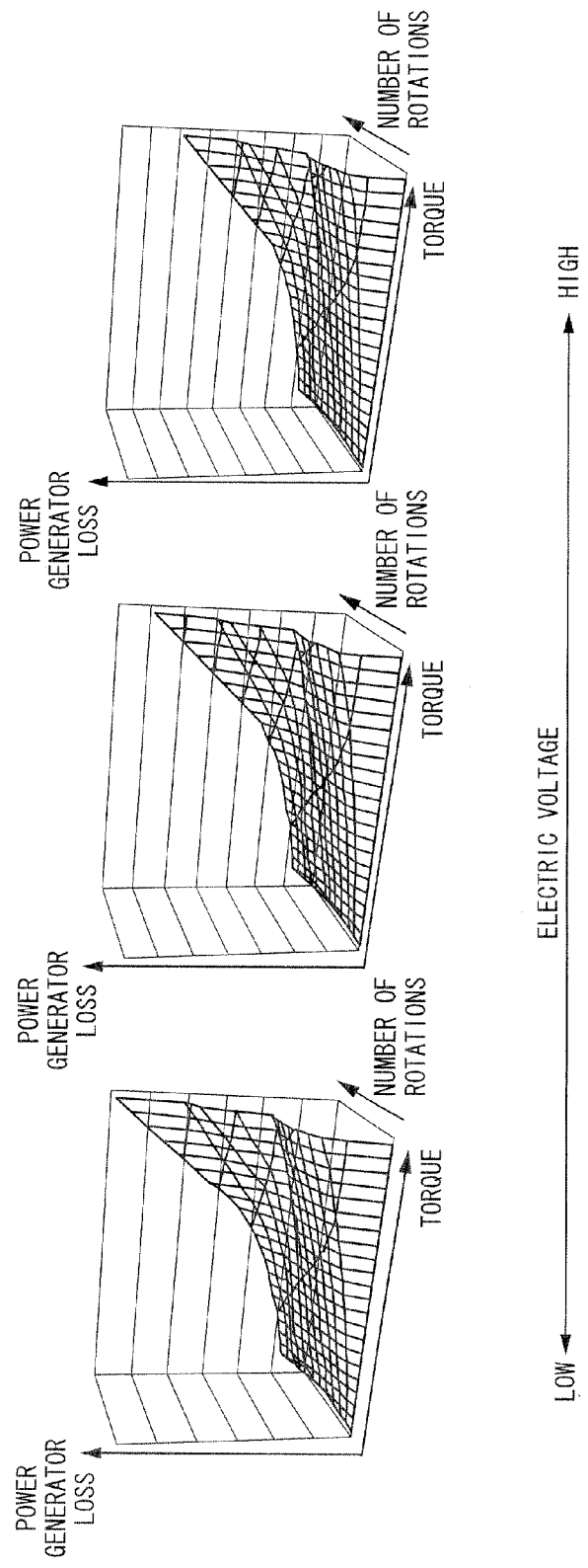
FIG. 11 is a diagram showing an example of a power generator loss map according to the above embodiment.

Next, in step S04, the first power generator loss value Qgen1 is obtained by searching through the power generator loss map as shown in FIG. 11, for example, according to the connection in parallel voltage Vp, the number of rotations of the power generator (G) 4, and the generated torque.

Incidentally, the power generator loss map is created according to the examination result of a test that is conducted in advance. For example, as a result of an increase in the number of rotations of the power generator (G) 4 or an increase in the generated torque, the power generator loss value increases. As a result of an increase in electric voltage, the power generator loss value decreases.

Next, in step S05, the first electric motor loss value Qmot1 and the first power generator loss value Qgen1 under the connection in parallel voltage Vp are added together. In this way, the total loss prediction value Qp (=Qmot1+Qgen1) of the electric motor (M) 2 and the power generator (G) 4 is computed.

Next, in step S06, a second electric motor loss value Qmot2 is obtained by searching through an electric motor loss map as shown in FIG. 10, for example, in accordance with the connection in series voltage Vs, the number of rotations of the electric motor (M) 2, and the generated torque.

Next, in step S07, the second power generator loss value Qgen2 is obtained by searching through the power generator loss map as shown in FIG. 11, for example, according to the connection in series voltage Vs, the number of rotations of the power generator (G) 4, and the generated torque.

Next, in step S08, the second electric motor loss value Qmot2 and the second power generator loss value Qgen2 under the connection in series voltage Vs are added together. In this way, the total loss prediction value Qs (=Qmot2+Qgen2) of the electric motor (M) 2 and the power generator (G) 4 is computed.

Next, in step S09, it is determined whether the total loss prediction value Qp under the connection in parallel voltage Vp is less than the total loss prediction value Qs under the connection in series voltage Vs.

When the result of step S09 is NO, the procedure moves on to step S12.

When the result of step S09 is YES, the procedure moves on to step S10.

Further, in step S10, it is determined whether the first battery 11 and the second battery 12 are connected in series with respect to the driving inverter 3 of the electric motor (M) 2.

When the result of step S10 is NO, the procedure ends.

Meanwhile, when the result of step S10 is YES, the procedure moves on to step S11. In this step S11, a switching operation from a connection in series to a connection in parallel is performed, and the procedure ends. This switching operation is described below.

Further, in step S12, it is determined whether the first battery 11 and the second battery 12 are connected in parallel with respect to the driving inverter 3 of the electric motor (M) 2.

When the result of step S12 is NO, the procedure ends.

Meanwhile, when the result of step S12 is YES, the procedure moves on to step S13. In this step S13, a switching operation from a connection in parallel to a connection in series is performed, and the procedure ends.

Next, a switching operation in step S11 described above from a connection in series to a connection in parallel is described.

Figure 12:
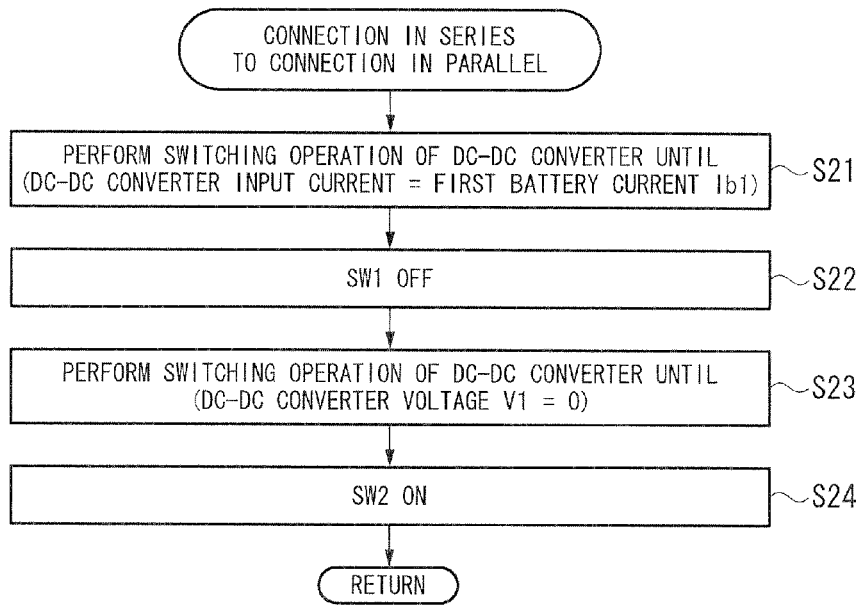
FIG. 12 is a flowchart showing a switching operation shown in FIG. 9 from a connection in series to a connection in parallel.

First, in step S21 shown in FIG. 12, for example, a switching operation of the DC-DC converter 13 is performed so that the DC-DC converter input electric current Idc becomes the same as the first battery electric current Ib1.

Next, in step S22, the first switch (SW1) 14 is switched from a closed state (i.e., turned on) to an opened state (i.e., turned off).

Next, in step S23, the second node B is made connectable to the fourth node D. A switching operation of the DC-DC converter 13 is performed so that the first DC-DC converter voltage V1 equals zero.

Next, in step S24, the second switch (SW2) 15 is switched from an opened state (i.e., turned off) to a closed state (i.e., turned on). The procedure then returns.

Hereinafter, a switching operation from a connection in parallel to a connection in series is described. This switching operation is conducted in step S13 as described above.

Figure 13:
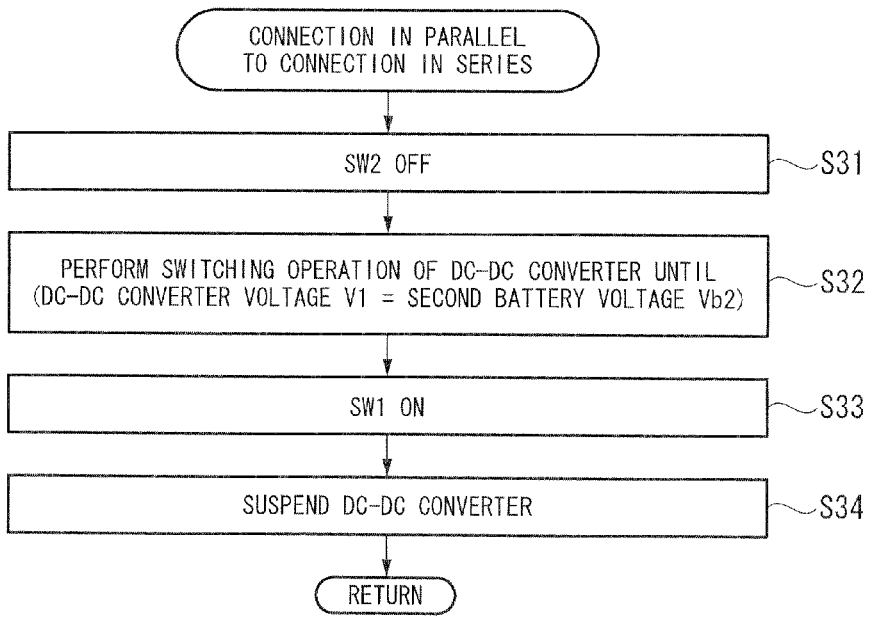
FIG. 13 is a flowchart showing a switching operation shown in FIG. 9 from a connection in parallel to a connection in series.

First, in step S31 shown in FIG. 13, for example, the second switch (SW2) 15 is switched from a closed state (i.e., turned on) to an opened state (i.e., turned off).

Next, in step S32, the second node B is made connectable to the third node C. Further, the switching operation of the DC-DC converter 13 is performed so that the first DC-DC converter voltage V1 becomes equal to the second battery voltage Vb2.

Next, in step S33, the first switch (SW1) 14 is switched from an opened state (i.e., turned off) to a closed state (i.e., turned on).

Next, in step S34, the switching operation of the DC-DC converter 13 is halted. The procedure then returns.

Hereinafter, a process of temporarily carrying out a switching operation of a DC-DC converter 13 is described. This DC-DC converter 13 is basically halted when the first battery 11 and the second battery 12 are connected in series with respect to a driving inverter 3 of an electric motor (M) 2.

Figure 14:
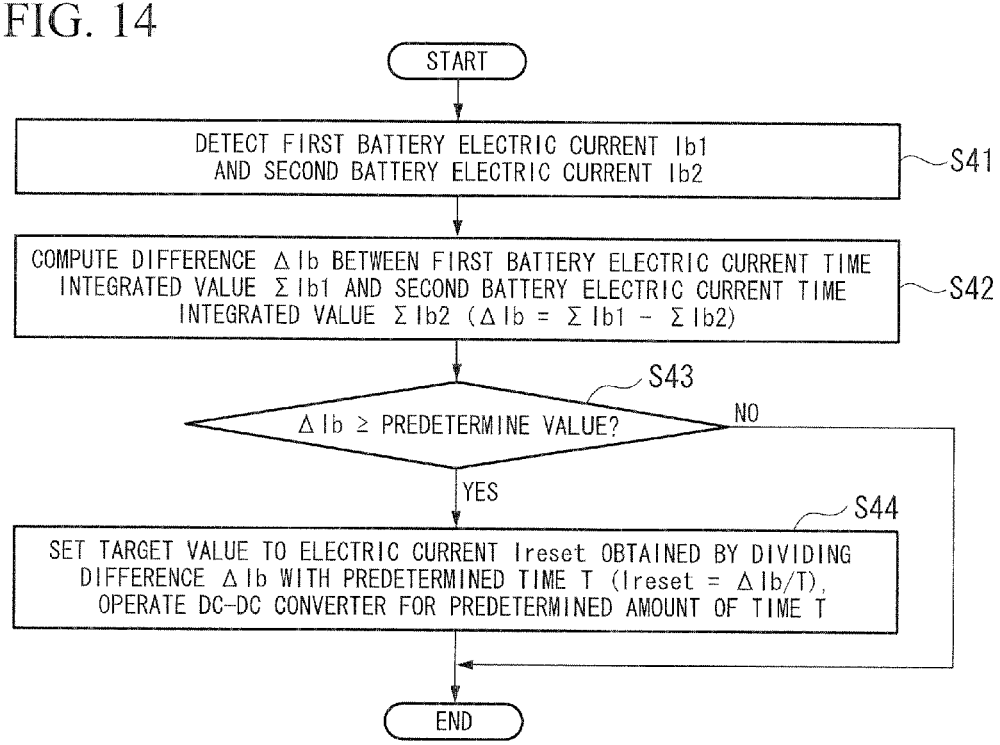
FIG. 14 is a flowchart showing a procedure of temporary executing a switching operation of a DC-DC converter in a condition in which a first battery and a second battery are connected in series with respect to an inverter for driving an electric motor (M) of a power unit of an electric vehicle according to the above embodiment.

First, in step S41 shown in FIG. 14, for example, the first battery electric current Ib1 and the second battery electric current Ib2 are detected.

Next, in step S42, a difference $\Delta Ib$ between a first battery electric current time integrated value $\Sigma Ib1$ and a second battery electric current time integrated value $\Sigma Ib2$ is computed ($\Delta Ib = \Sigma Ib1 - \Sigma Ib2$). The first battery electric current time integrated value $\Sigma Ib1$ is obtained by performing an integral of the first battery electric current Ib1. The second battery electric current time integrated value $\Sigma Ib2$ is obtained by performing an integral of the second battery electric current Ib2.

This difference $\Delta Ib$ is a value corresponding to a difference in the remaining capacity SOC of the first battery 11 and the second battery 12.

Next, in step S43, it is determined whether or not the difference $\Delta Ib$ is greater than or equal to a predetermined value.

When the result is "NO," the procedure ends.

Meanwhile, when the result is "YES," the procedure moves on to step S44.

Then, in step S44, a target value of the DC-DC converter input electric current Idc is set to be the electric current Ireset obtained by dividing the difference $\Delta Ib$ with a predetermined time T (Ireset=$\Delta Ib/T$). A switching operation of the DC-DC converter 13 is performed for a predetermined amount of time T. Then procedure then ends.

Figure 15:
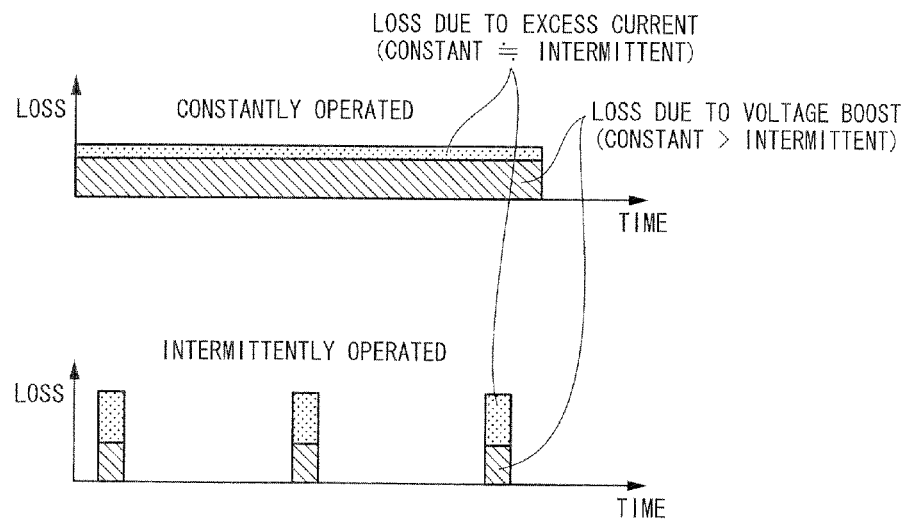
FIG. 15 is a diagram showing an example of a loss due to a passing current and a loss due to an increase in electric voltage with respect to a case in which an intermittent switching is performed and a case in which a switching operation of a DC-DC converter is constantly executed in a condition in which a first battery and a second battery are connected in series with respect to an inverter for driving an electric motor (M) of a power unit of an electric vehicle according to the above embodiment.

Incidentally, an intermittent switching is performed in a condition in which the first battery 11 and the second battery 12 are connected in series with respect to the driving inverter 3 of the electric motor (M) 2. As shown in FIG. 15, for example, compared to a case in which the switching operation of the DC-DC converter 13 is constantly performed, the loss due to the electric current passage of the DC-DC converter 13 is approximately equal in a case in which intermittent switching is performed. Meanwhile, compared to a case in which the switching operation of the DC-DC converter 13 is constantly performed, the loss due to a boost in electric voltage is smaller in a case in which intermittent switching is performed.

As described above, according to a power unit 1 for an electric vehicle based on the above embodiment described above, when the load of the electric motor (M) 2 is small, and the driving voltage necessary for the electric motor (M) 2 is small, the first battery 11 and the second battery 12 are connected in parallel with respect to the driving inverter 3 of the electric motor (M) 2.

Meanwhile, when the load of the electric motor is large, and the driving voltage necessary for the electric motor is large, the first battery 11 and the second battery 12 are connected in series with respect to the driving inverter 3 of the electric motor (M) 2.

In these ways, when the load of the electric motor (M) 2 is large, it is possible to obtain a predetermined engine performance by increasing the driving voltage of the electric motor (M) 2. When the load of the electric motor (M) 2 is small, it is possible to enhance the driving efficiency of the electric motor (M) 2 and the driving inverter 3 by preventing the driving voltage of the electric motor (M) 2 from being excessively large.

Moreover, the connection between the first battery 11 and the second battery 12 is switched to a connection in series or a connection in parallel by comparing the total loss prediction value Qp during a connection in parallel voltage Vp and the total loss prediction value Qs during a connection in series voltage Vs. In this way, the electric vehicle mounted with the power unit 1 may be operated efficiently.

Furthermore, when a connection in parallel between the first battery 11 and the second battery 12 is switched to a connection in series according to an increase in the load of the electric motor (M) 2, first, the first switch (SW1) 14 and the second switch (SW2) 15 are opened (i.e., turned off). In this way, the second battery 12 is cut off from the electric motor (M) 2. Thus, electric power is supplied to the electric motor (M) 2 only by the first battery 11.

Then, a voltage boosting operation of the DC-DC converter 13 is performed until the electric potential VB of the second node B connected to the first switch (SW1) 14 becomes equal to the electric potential VC of the third node C connected to the first switch (SW1) 14. When the voltage boosting operation of the DC-DC converter 13 is terminated, the first switch (SW1) 14 is closed (i.e., turned on).

As a result, it is possible to switch the connection of the first battery 11 and the second battery 12 with respect to the electric motor (M) 2 between a connection in parallel and a connection in series according to the magnitude of the load of the electric motor (M) 2 in a condition in which the electric power supply to the electric motor (M) 2 is maintained. Therefore, for example, even during an AER (All Electric Range) travel, when the vehicle is run only with electric power supplied by the battery without using power from an internal combustion, the cruise control may be maintained at least by the electric power supplied by the first battery 11.

Moreover, by operating the DC-DC converter 13 only during a switching of the connection between the first battery 11 and the second battery 12, it is possible to restrain an increase in the switching loss.

In addition, when an auxiliary power unit (APU) including a power generator (G) 4 is provided, the difference between the input and the output between the auxiliary power unit and the electric motor (M) may be absorbed at least by the first battery 11. In this way, it is possible to perform a cruise control by reducing the fluctuation in electric voltage.

Further, when the first battery 11 and the second battery 12 are connected in series with respect to the driving inverter 3 of the electric motor (M) 2, it is possible to adjust the difference in the remaining capacity SOC between the first battery 11 and the second battery 12 based on the operation of the DC-DC converter 13.

Since it is not necessary to connect the auxiliary machine 16 to the side of the electric motor (M) 2 to which a DC voltage is applied, it is possible to use a low-voltage machine as the auxiliary machine 16. In this way, it is possible to prevent an increase in the cost necessary for configuring the device.

During an adjustment of the difference in the remaining capacity SOC between the first battery 11 and the second battery 12, it is possible to allow the DC-DC converter 13 to be operated only when the difference in the remaining capacity SOC is greater than or equal to a predetermined difference. Thus, the DC-DC converter 13 is operated intermittently. As a result, it is possible to reduce the switching loss compared to a case in which the DC-DC converter 13 is constantly operated.

Electric power consumed by the auxiliary machine 16 may be supplied by the second battery 12. Thus, when the connection of the first battery 11 and the second battery 12 with respect to the driving inverter 3 of the electric motor (M) 2 is switched between a connection in parallel and a connection in series, it is possible to supply more electric power to the electric motor (M) 2 from the first battery 11 which provides the electric power consumed by the electric motor (M) 2.

According to the embodiment described above, it is possible to omit the power generator (G) 4 and the power generating inverter 5 when, for example, the power unit 1 is mounted on the electric vehicle.

In this case, the operation of switching the connection of the first battery 11 and the second battery 12 with respect to the driving inverter 3 of the electric motor (M) 2 is switched between the first battery 11 and the second battery 12 is performed according to the result of a comparison between the first electric motor loss value Qmot1 and the second electric motor loss value Qmot2.

In other words, when the first electric motor loss value Qmot1 is less than the second electric motor loss value Qmot2, and when a connection in series is made, the connection in series is switched to a connection in parallel. When a connection in parallel is already made, the status quo is maintained without performing a switching operation.

On the other hand, when the first electric motor loss value Qmot1 is greater than or equal to the second electric motor loss value Qmot2, and when a connection in parallel is made, the connection in parallel is switched to a connection in series. When a connection in series is already made, the status quo is maintained without performing a switching operation.

Figure 16:
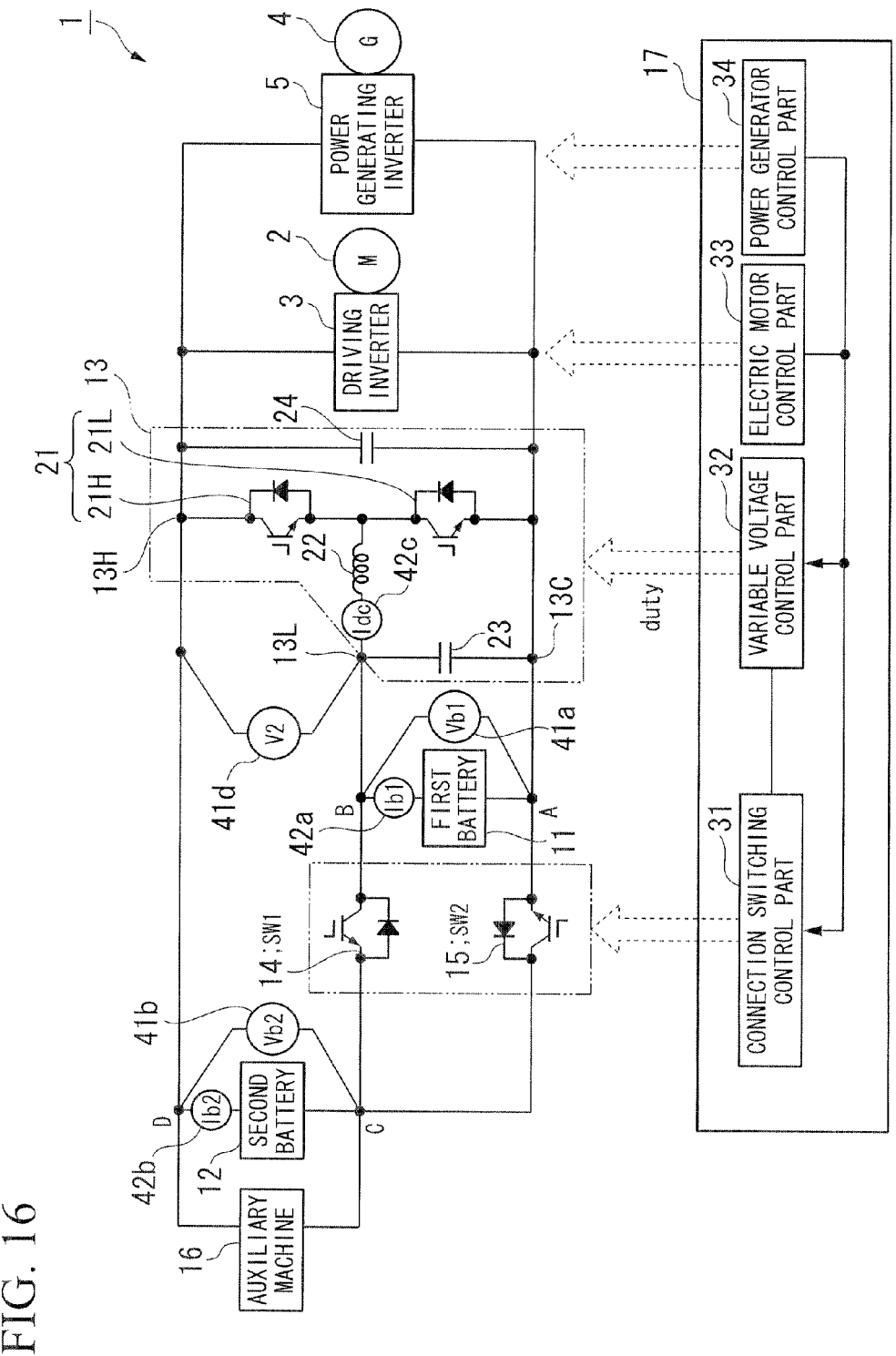
FIG. 16 is a configuration diagram of a power unit for an electric vehicle according to a variation of an embodiment of the present invention.

Incidentally, according to the above embodiment, the polarity of each component of the power unit 1 for the electric vehicle may be made opposite, as shown in the variation shown in FIG. 16, for example.

The configuration of the power unit 1 for the electric vehicle based on this variation is different from the configuration of the power unit 1 for the electric vehicle based on the above embodiment in that, according to the variation, the high voltage side terminal 13H of the DC-DC converter 13 is connected to the fourth node D, the common terminal 13C is connected to the first node A, and a voltage sensor 41d is provided instead of the voltage sensor 41c. The voltage sensor 41d detects the voltage V2 (the second DC-DC converter voltage) between the high voltage side terminal 13H and the low voltage side terminal 13L.

Hereinafter, an operation of the power unit 1 for the electric vehicle according to the variation of the above embodiment is described.

Figure 17A:
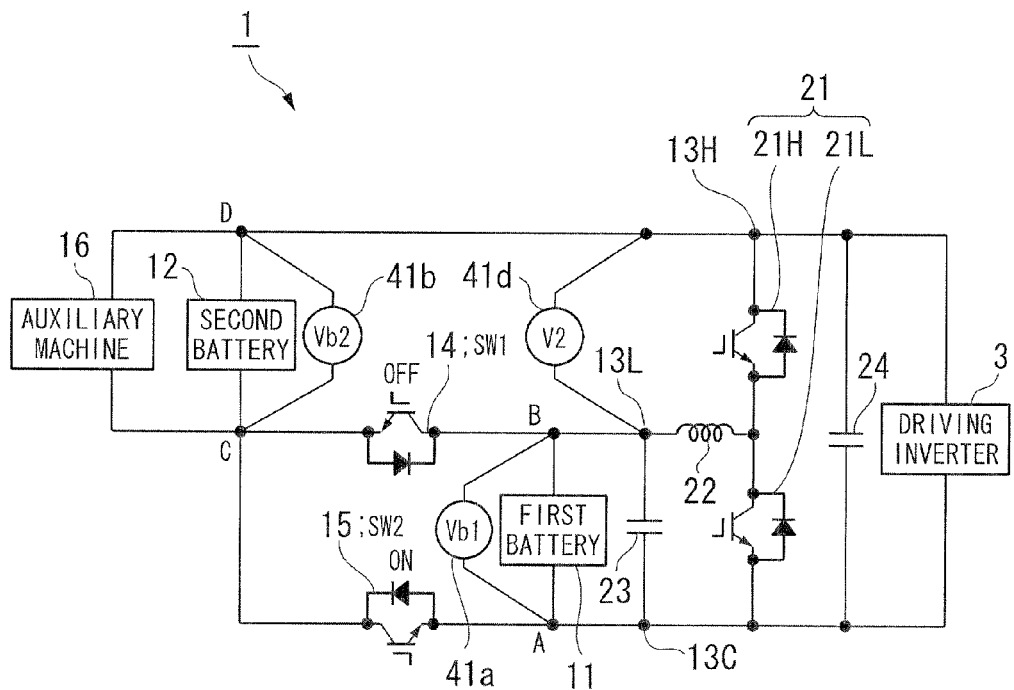
FIG. 17A is a diagram showing a condition of connecting a first battery and a second battery in parallel with respect to an inverter for driving an electric motor (M) of a power unit of an electric vehicle according to a variation of an embodiment of the present invention.

As shown in FIG. 17A, for example, when the load of the electric motor (M) 2 is small and the driving voltage necessary for the electric motor (M) 2 is small, the control device 17 opens the first switch (SW1) 14 (i.e., turns off the first switch) and closes the second switch (SW2) 15 (i.e., turns on the second switch). In this way, the first battery 11 and the second battery 12 are connected in parallel with respect to the driving inverter 3 of the power generator (M) 2.

When this connection in parallel is made, the switching duty of the DC-DC converter 13 is set to zero.

Figure 17B:
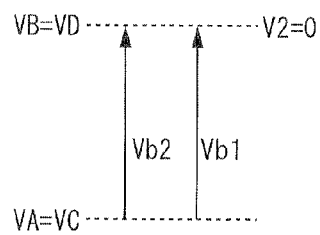
FIG. 17B is a diagram showing a condition of connecting a first battery and a second battery in parallel with respect to an inverter for driving an electric motor (M) of a power unit of an electric vehicle according to a variation of an embodiment of the present invention.

As a result, as shown in FIG. 17B, for example, the electric potential VA of the first node A becomes equal to the electric potential VC of the third node C, the electric potential VB of the second node B becomes equal to the electric potential VD of the fourth node D, the first battery voltage Vb1 becomes equal to the second battery voltage Vb2, the first battery electric current Ib1 becomes equal to the second battery electric current Ib2, and the electric voltage V2 becomes equal to zero.

At the same time, the electric potential VB of the second node B and the electric potential VD of the fourth node D becomes greater than the electric potential VA of the first node A and the electric potential VC of the third node C by an amount of the first battery voltage Vb1 or the second battery voltage Vb2.

When this connection in parallel is made, and the driving voltage necessary for the electric motor (M) 2 increases due to an increase in the load of the electric motor (M) 2, for example, the control device 17 performs a switching operation to switch the connection of the first battery 11 and the second battery 12 with respect to the driving inverter 3 of the electric motor (M) 2 to a connection in series.

When this connection-switching operation is performed, the control device 17 first maintains the first switch (SW1) 14 in an opened state (i.e., the first switch is turned off), and switches the second switch (SW2) 15 from a closed state (i.e., the second switch is turned on) to an opened state (i.e., the second switch is turned off).

Further, the control device 17 increases the value of the switching duty of the DC-DC converter 13 to a value less than 1. The value of the switching duty of the DC-DC converter is represented by the following equation (4), for example. In this way, a switching operation is performed.

(Equation 4)

$$\frac{Vb1}{(Vb1 + V2)} = 1 - \text{duty} \quad (4)$$

Figure 18A:
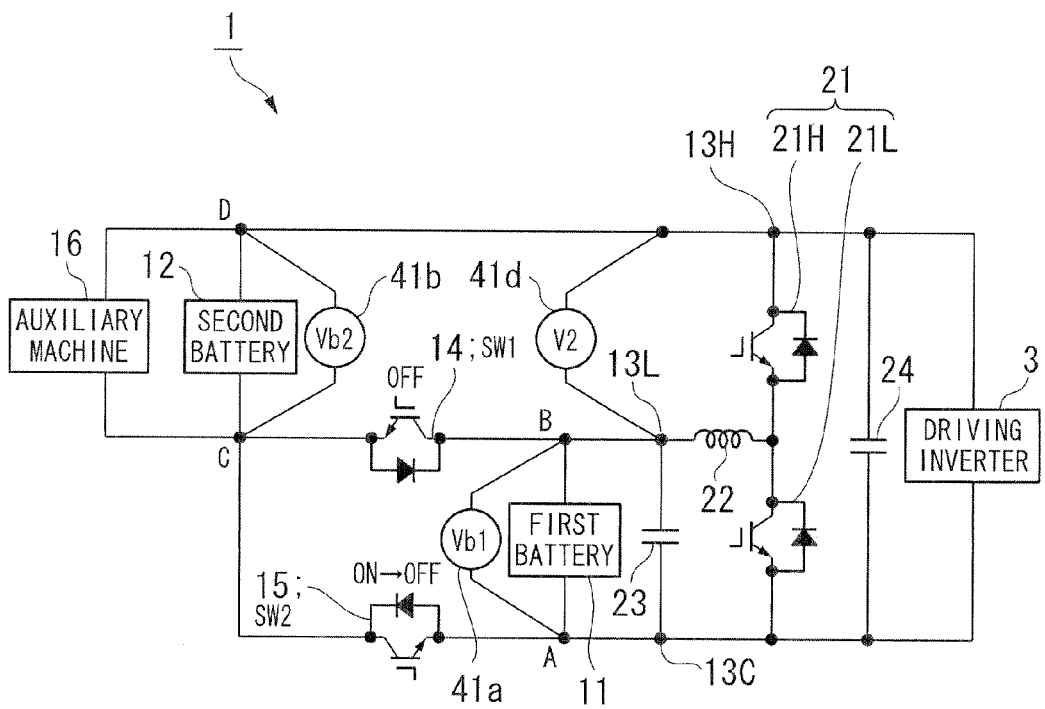
FIG. 18A is a diagram showing a condition of switching a connection between a first battery and a second battery from a connection in parallel to a connection in series with respect to an inverter for driving an electric motor (M) of a power unit of an electric vehicle according to a variation of an embodiment of the present invention.
Figure 18B:
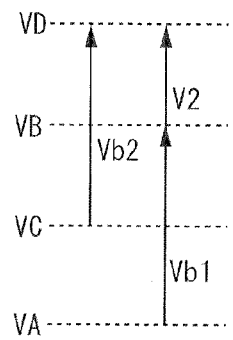
FIG. 18B is a diagram showing a condition of switching a connection between a first battery and a second battery from a connection in parallel to a connection in series with respect to an inverter for driving an electric motor (M) of a power unit of an electric vehicle according to a variation of an embodiment of the present invention.

Accordingly, as shown in FIG. 18B and the following equation (5), for example, the second DC-DC converter voltage V2 increases to a value greater than zero. The electric potential VB of the second node B becomes less than the electric potential VD of the fourth node D by an amount of the second DC-DC converter voltage V2. The electric potential VA of the first node A becomes lower than the electric potential VD of the fourth node D by a sum of the second DC-DC converter voltage V2 and the first battery voltage Vb1 (V2+Vb1).

(Equation 5)

$$V2 = \left(\frac{1}{\text{duty}} - 1\right) \cdot Vb1 \quad (5)$$

Figure 19A:
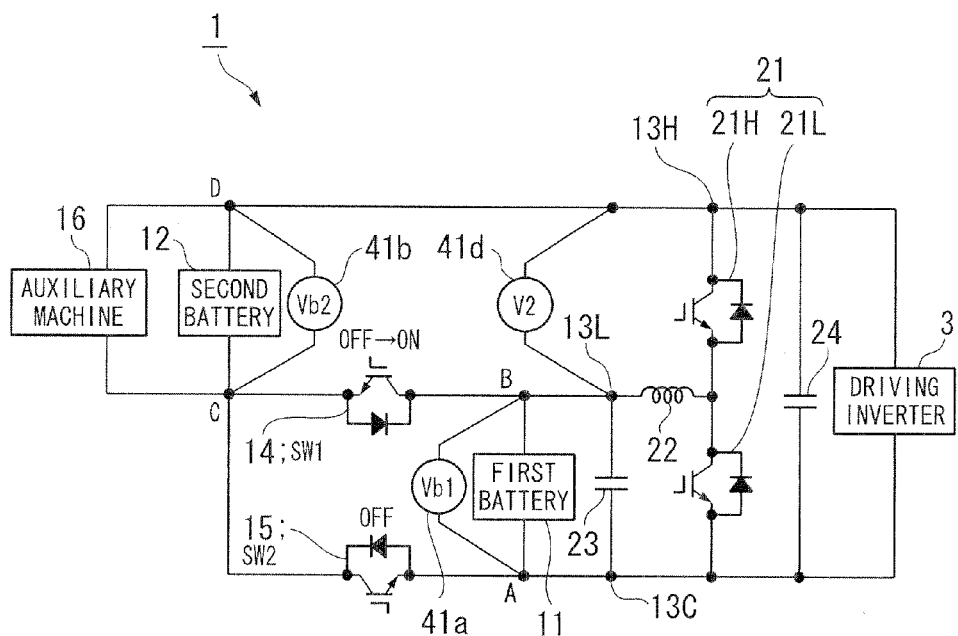
FIG. 19A is a diagram showing a condition of switching a connection between a first battery and a second battery from a connection in parallel to a connection in series with respect to an inverter for driving an electric motor (M) of a power unit of an electric vehicle according to a variation of an embodiment of the present invention.

Next, when the second DC-DC converter voltage V2 reaches the second battery voltage Vb2, i.e., when the second node B may be connected to the third node C, the control device 17 maintains the switching operation of the DC-DC converter 13 as shown in FIG. 19A, for example. In addition, the control device 17 switches the first switch (SW1) 14 from an opened state (i.e., a state in which the first switch is turned off) to a closed state (i.e., a state in which the first switch is turned on). At the same time, the second switch (SW2) 15 is maintained to be an opened state (i.e., turned off). Further, the first battery 11 and the second battery 12 are connected in series with respect to the driving inverter 3 of the electric motor (M) 2.

Figure 19B:
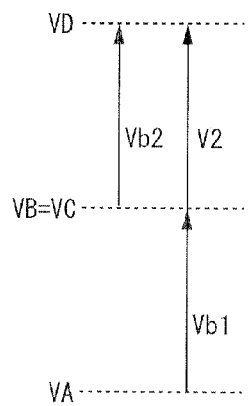
FIG. 19B is a diagram showing a condition of switching a connection between a first battery and a second battery from a connection in parallel to a connection in series with respect to an inverter for driving an electric motor (M) of a power unit of an electric vehicle according to a variation of an embodiment of the present invention.

As a result, as shown in FIG. 19B for example, the electric potential VB of the second node B becomes equal to the electric potential VC of the third node C. At the same time, the electric potential VB of the second node B and the electric potential VC of the third node C becomes lower than the electric potential VD of the fourth node D by an amount of the second DC-DC converter voltage V2. The second DC-DC converter V2 is the same as the second battery voltage Vb2. The electric potential VA of the first node A becomes lower than the electric potential VC of the third node C by an amount of the first battery voltage Vb1.

When this connection in series is made, the switching duty of the DC-DC converter 13 is represented as shown in the following equation (6), for example.

(Equation 6)

$$\text{duty} = \frac{Vb2}{(Vb1 + Vb2)} \quad (6)$$

When the above connection in series is made, the control device 17 basically stops the switching operation of the DC-DC converter 13. The control device 17 performs an intermittent switching operation by performing a switching operation temporarily according to the condition of the second battery 12 supplying electric power to the auxiliary machine 16, for example.

Figure 20A:
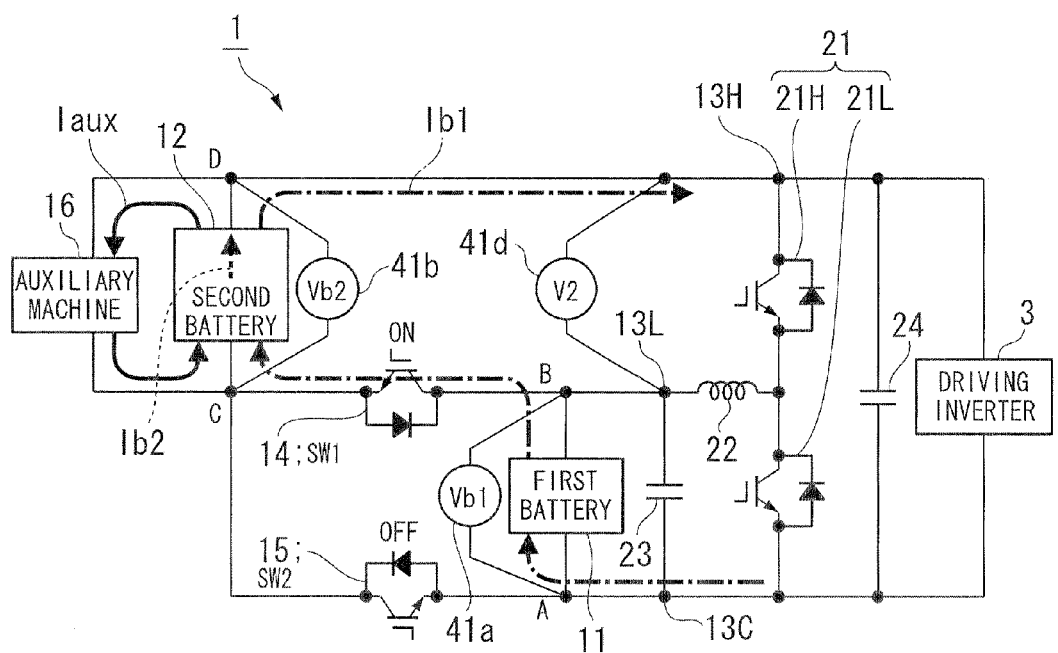
FIG. 20A is a diagram showing a condition of halting a DC-DC converter when a first battery and a second battery are connected in series with respect to an inverter for driving an electric motor (M) of a power unit of an electric vehicle according to a variation of an embodiment of the present invention.
Figure 20B:
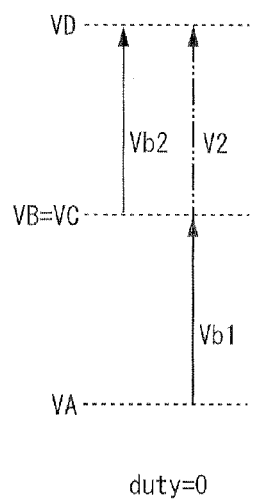
FIG. 20B is a diagram showing a condition of halting a DC-DC converter when a first battery and a second battery are connected in series with respect to an inverter for driving an electric motor (M) of a power unit of an electric vehicle according to a variation of an embodiment of the present invention.

As shown in FIGS. 20A and 20B, for instance, when the switching operation of the DC-DC converter 13 is halted during a connection in series, the switching duty (duty) equals zero. Further, as shown in FIG. 21, for example, the first battery electric current Ib1 at the operating point of the first battery 11 becomes smaller than the second battery electric current Ib2 at the operating point of the second battery 12 by an amount of the electric current Iaux supplied from the second battery 12 to the auxiliary machine 16.

Figure 22A:
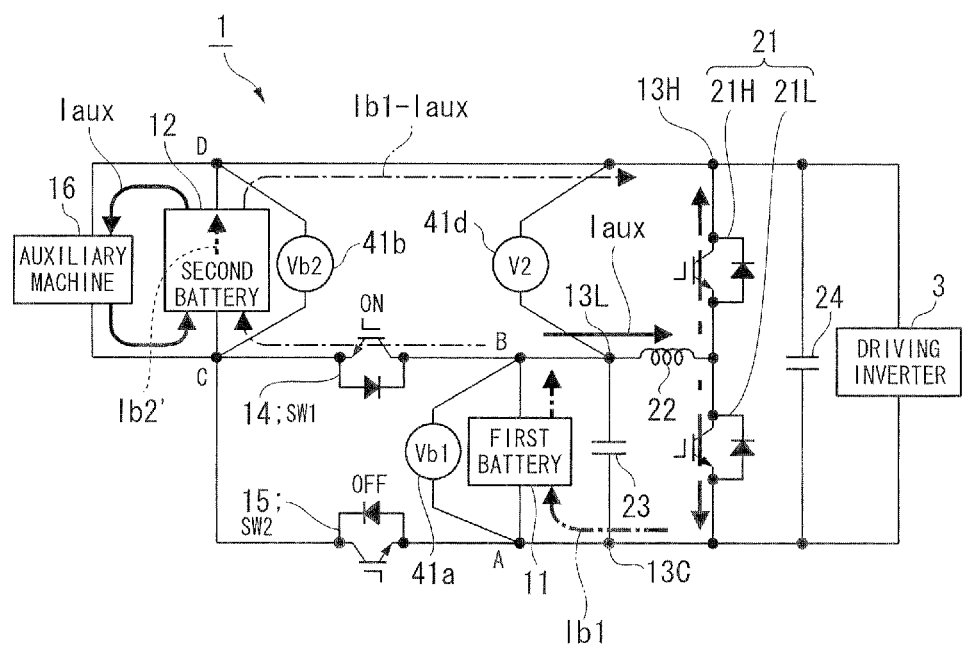
FIG. 22A is a diagram showing a condition in which a switching operation of a DC-DC converter is executed when a first battery and a second battery are connected in series with respect to an inverter for driving an electric motor (M) of a power unit of an electric vehicle according to a variation of an embodiment of the present invention.
Figure 22B:
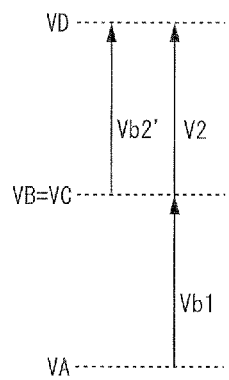
FIG. 22B is a diagram showing a condition in which a switching operation of a DC-DC converter is executed when a first battery and a second battery are connected in series with respect to an inverter for driving an electric motor (M) of a power unit of an electric vehicle according to a variation of an embodiment of the present invention.

Further, as shown in FIGS. 22A and 22B, for instance, when a switching operation of the DC-DC converter 13 is performed during a connection in series, the operating point of the second battery 12 deviates compared to the condition in which the DC-DC converter 13 is halted.

For example, when the switching duty is set to 0.5, the electric current Iaux runs through the low voltage side terminal 13L of the DC-DC converter 13. The electric current Iaux is the same as the electric current Iaux supplied from the second battery 12 to the auxiliary machine 16.

Figure 21:
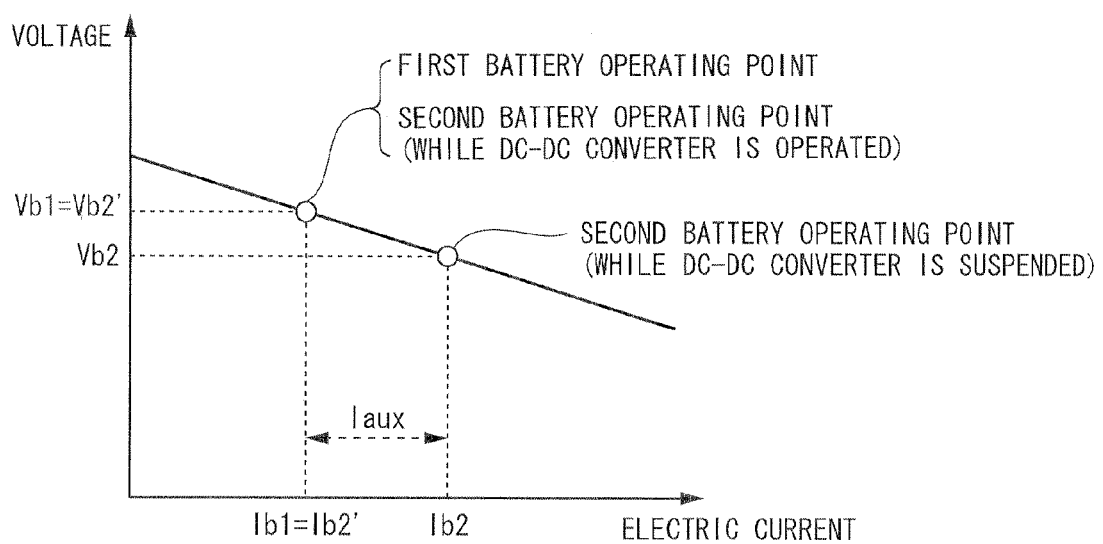
FIG. 21 is a diagram showing an example of an operating point of a first battery and a second battery in a condition in which a switching operation is executed and in a condition in which a DC-DC converter is halted when a first battery and a second battery are connected in series with respect to an inverter for driving an electric motor (M) of a power unit of an electric vehicle according to a variation of an embodiment of the present invention.

Further, as shown in FIG. 21, for example, the operating point of the second battery 12 becomes equal to the operating point of the first battery 11. Thus, the first battery voltage Vb1 becomes equal to the second battery voltage Vb2'. At the same time, the first battery electric current Ib1 becomes equal to the second battery electric current Ib2'.

The present invention is not limited to the embodiment described above. The present invention encompasses multiple variations obtained by varying the embodiment described above within the gist of the present invention.

The invention claimed is:

1. A power unit for an electric vehicle, the power unit comprising:
   a first power source connected between a first node and a second node;
   a first switch connected between the second node and a third node;
   a second power source connected between the third node and a fourth node;
   a second switch connected between the first node and the third node;
   a DC-DC converter connected to the second node; and
   a switching unit switching between a first connected condition, a second connected condition, and a third connected condition,
   wherein the DC-DC converter changes an electric potential of the second node by making the second node connectable to the fourth node or the third node, and
   an output electric power obtained from between the first node and the fourth node is supplied to an electric motor, and
   wherein:
   in the first connected condition, the first node is connected with the third node by opening the first switch and closing the second switch,
   in the second connected condition, the second node is connected with the third node by closing the first switch and opening the second switch,
   in the third connected condition, the third node is disconnected from the first node and the second node by opening the first switch and opening the second switch, and
   the switching unit switches between the first connected condition and the second connected condition via the third connected condition.

2. The power unit for the electric vehicle according to claim 1, wherein
   the first power source is a first secondary battery;
   the second power source is a second secondary battery; and
   in the second connected condition, the DC-DC converter operates intermittently according to a difference in a remaining capacity of the first power source and a remaining capacity of the second power source.

3. The power unit for the electric vehicle according to claim 1, further comprising an auxiliary machine between the third node and the fourth node.

4. The power unit for the electric vehicle according to claim 1, wherein the switching unit compares a loss of the electric motor in the first connected condition and a loss of the electric motor in the second connected condition, and switches to a condition among the first connected condition and the second connected condition having a smaller loss of the electric motor.

5. The power unit for the electric vehicle according to claim 1, further comprising a power generator connected in parallel with the electric motor between the first node and the fourth node, wherein
   the switching unit compares a sum of a loss of the electric motor and a loss of the power generator in the first connected condition with a sum of a loss of the electric motor and a loss of the power generator in the second connected condition, and switches to a condition among the first connected condition and the second connected condition having a smaller sum of the loss of the electric motor and the loss of the power generator.

6. The power unit for the electric vehicle according to claim 1, wherein a low voltage side terminal of the DC-DC converter is connected to the second node, a high voltage side terminal of the DC-DC converter is connected to the first node, and a common terminal is connected to the fourth node.

7. The power unit for the electric vehicle according to claim 1, wherein a low voltage side terminal of the DC-DC converter is connected to the second node, a high voltage side terminal of the DC-DC converter is connected to the fourth node, and a common terminal is connected to the first node.

\* \* \* \* \*